(12) United States Patent
Ishii et al.

(10) Patent No.: US 9,678,905 B2
(45) Date of Patent: Jun. 13, 2017

(54) BUS CONTROLLER, BUS CONTROL SYSTEM AND NETWORK INTERFACE

(71) Applicant: Panasonic Corporation, Osaka (JP)

(72) Inventors: Tomoki Ishii, Kyoto (JP); Takao Yamaguchi, Osaka (JP); Atsushi Yoshida, Osaka (JP); Satoru Tokutsu, Saitama (JP); Yuuki Soga, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 330 days.

(21) Appl. No.: 14/155,660

(22) Filed: Jan. 15, 2014

(65) Prior Publication Data
US 2014/0129750 A1 May 8, 2014

Related U.S. Application Data

(63) Continuation of application No. PCT/JP2013/002973, filed on May 9, 2013.

(30) Foreign Application Priority Data

May 11, 2012 (JP) .................. 2012-109835

(51) Int. Cl.
*G06F 13/362* (2006.01)
*G06F 15/78* (2006.01)
(Continued)

(52) U.S. Cl.
CPC ........ *G06F 13/362* (2013.01); *G06F 15/7825* (2013.01); *H04L 12/4625* (2013.01); *H04L 12/6418* (2013.01)

(58) Field of Classification Search
CPC ............... G06F 13/362; G06F 15/7825; H04L 12/4625; H04L 12/6418
See application file for complete search history.

(56) References Cited

U.S. PATENT DOCUMENTS 5,471,580 A 11/1995 Fujiwara et al.
6,510,135 B1 * 1/2003 Almulhem ............. H04L 29/06
                                                                 370/229
(Continued)

FOREIGN PATENT DOCUMENTS

CN       1126391 C       10/2003
CN       1910571 A       2/2007
(Continued)

OTHER PUBLICATIONS

International Search Report for corresponding International Application No. PCT/JP2013/002973 mailed Jul. 2, 2013.
(Continued)

*Primary Examiner* — Nimesh G Patel
(74) *Attorney, Agent, or Firm* — Renner, Otto, Boisselle & Sklar, LLP.

(57) ABSTRACT

In a bus control system for a semiconductor circuit, data is transmitted between first and second nodes over a network of buses. The bus controller is connected directly to the first node and includes: a route load detector which detects loads on routes that form at least one of a group of forward routes leading from the first to the second node and a group of backward routes leading from the second to the first node; a candidate route extraction circuit which extracts a candidate route from the group of routes so that loads on the routes that form the group become uniform; a route determining circuit which determines the route to transmit the data based on the candidate route and a predetermined selection rule; and a data communication circuit which transmits the data between the first and second nodes based on header information including route information indicating the route.

20 Claims, 17 Drawing Sheets

(51) Int. Cl.
*H04L 12/64* (2006.01)
*H04L 12/46* (2006.01)

(56) References Cited

U.S. PATENT DOCUMENTS

| | | |
|---|---|---|
| 6,594,238 B1 | 7/2003 | Wallentin et al. |
| 7,284,051 B1 | 10/2007 | Okano et al. |
| 2001/0007557 A1 | 7/2001 | Yamada et al. |
| 2005/0021874 A1 | 1/2005 | Georgiou et al. |
| 2012/0044942 A1 | 2/2012 | Yamaguchi et al. |
| 2012/0079147 A1* | 3/2012 | Ishii ................. H04L 12/40019 710/107 |

FOREIGN PATENT DOCUMENTS

| | | |
|---|---|---|
| JP | 05-204876 A | 8/1993 |
| JP | 11-341060 A | 12/1999 |
| JP | 2000-244559 A | 9/2000 |
| JP | 2001-197118 A | 7/2001 |
| JP | 2002-518958 T | 6/2002 |
| JP | 2005-303828 A | 10/2005 |
| JP | 4796668 B | 8/2011 |
| JP | 2011-193258 A | 9/2011 |
| WO | WO 99/66748 A1 | 12/1999 |
| WO | WO 2011/004566 A1 | 1/2011 |

OTHER PUBLICATIONS

Form PCT/ISA/237 for corresponding International Application No. PCT/JP2013/002973 dated Jul. 2, 2013 and partial English translation.

Chinese Search Report dated Jun. 22, 2016 and English translation thereof for corresponding Chinese Patent Application No. 201380002031.4.

* cited by examiner

FIG.4

| INITIATOR | FORWARD ROUTE REQUESTED BANDWIDTH | BACKWARD ROUTE REQUESTED BANDWIDTH |
|---|---|---|
| 401 | 300MB/s | 100MB/s |
| 402 | 200MB/s | 300MB/s |
| 403 | 200MB/s | 300MB/s |
| 404 | 100MB/s | 100MB/s |

FIG.5

| TRANSFER DIRECTION | TRANSFER ROUTE | REQUESTED BANDWIDTH (MB/s) | | | | |
|---|---|---|---|---|---|---|
| | | tc=0 | tc=1000 | tc=2000 | tc=3000 | tc=4000 |
| FORWARD ROUTE | ROUTE A | 0 | 300 | 300 | 300 | 400 |
| | ROUTE B | 0 | 0 | 200 | 400 | 400 |
| BACKWARD ROUTE | ROUTE A | 0 | 100 | 100 | 400 | 400 |
| | ROUTE B | 0 | 0 | 300 | 300 | 400 |

FIG.6

| 1 | 2 | 3 | 4 |
|---|---|---|---|
| MEMORY SIDE NI ID | LOCAL BUS FORWARD ROUTE ID | INITIATOR SIDE NI ID | LOCAL BUS BACKWARD ROUTE ID |

FIG.7

| 1 | 2 | 3 | 4 |
|---|---|---|---|
| INITIATOR SIDE NI ID | LOCAL BUS BACKWARD ROUTE ID | MEMORY SIDE NI ID | LOCAL BUS FORWARD ROUTE ID |

FIG.9

| FLOW ID | | LOCAL BUS ROUTE SELECTION RULE | |
|---|---|---|---|
| INITIATOR SIDE NI ID | FLOW NUMBER | FORWARD ROUTE | BACKWARD ROUTE |
| 413 | 01 | NO LIMITATIONS | NO LIMITATIONS |
| 413 | 02 | FIXED AT ROUTE B | FIXED AT ROUTE B |
| 413 | 03 | NO LIMITATIONS | NEEDS TO OBSERVE ORDER WITH RESPECT TO FLOW 04 |
| 413 | 04 | NO LIMITATIONS | NEEDS TO OBSERVE ORDER WITH RESPECT TO FLOW 03 |

FIG.10

| ROUTE | FORWARD ROUTE ALLOCATED BANDWIDTH (MB/s) | BACKWARD ROUTE ALLOCATED BANDWIDTH (MB/s) |
|---|---|---|
| A | 300 | 100 |
| B | 200 | 300 |

FIG.12

| FLOW ID | | LOCAL BUS SELECTED ROUTE | |
|---|---|---|---|
| INITIATOR SIDE NI ID | FLOW NUMBER | FORWARD ROUTE | BACKWARD ROUTE |
| 413 | 01 | ROUTE B | ROUTE A |
| 413 | 02 | ROUTE B | ROUTE B |
| 413 | 03 | ROUTE A | ROUTE A |
| 413 | 04 | ROUTE B | |

FIG.13

| 1 | 2 | 3 | 4 | 5 | 6 |
|---|---|---|---|---|---|
| MEMORY SIDE NI ID | LOCAL BUS FORWARD ROUTE ID | INITIATOR SIDE NI ID | LOCAL BUS BACKWARD ROUTE ID | FLOW'S FORWARD ROUTE REQUESTED BANDWIDTH | FLOW'S BACKWARD ROUTE REQUESTED BANDWIDTH |

FIG.16

| FLOW ID | | RULE OF SELECTING ROUTE TO MEMORY | | DEGREE OF PRIORITY |
|---|---|---|---|---|
| INITIATOR SIDE NI ID | FLOW NUMBER | FORWARD ROUTE | BACKWARD ROUTE | |
| 2001 | 01 | NON-RATE-ENSURED | NON-RATE-ENSURED | HIGH |

| FLOW ID | | RULE OF SELECTING ROUTE TO MEMORY | | DEGREE OF PRIORITY |
|---|---|---|---|---|
| INITIATOR SIDE NI ID | FLOW NUMBER | FORWARD ROUTE | BACKWARD ROUTE | |
| 2002 | 01 | NON-RATE-ENSURED | NON-RATE-ENSURED | HIGH |

| FLOW ID | | RULE OF SELECTING ROUTE TO MEMORY | | DEGREE OF PRIORITY |
|---|---|---|---|---|
| INITIATOR SIDE NI ID | FLOW NUMBER | FORWARD ROUTE | BACKWARD ROUTE | |
| 2003 | 01 | NON-RATE-ENSURED | NON-RATE-ENSURED | LOW |

FIG.17

| ROUTE | NON-RATE-ENSURED FLOW ALLOCATION STATUS | | | |
|---|---|---|---|---|
| | FORWARD ROUTE | | BACKWARD ROUTE | |
| | NUMBER OF FLOWS | DEGREE OF PRIORITY | NUMBER OF FLOWS | DEGREE OF PRIORITY |
| A | 0 | | 0 | |
| C | 1 | LOW | 1 | LOW |

FIG.18

| ROUTE | NON-RATE-ENSURED FLOW ALLOCATION STATUS | | | |
|---|---|---|---|---|
| | FORWARD ROUTE | | BACKWARD ROUTE | |
| | NUMBER OF FLOWS | DEGREE OF PRIORITY | NUMBER OF FLOWS | DEGREE OF PRIORITY |
| A | 1 | HIGH | 1 | HIGH |
| C | 1 | LOW | 1 | LOW |

FIG.19

| 1 | 2 | 3 | 4 | 5 | 6 |
|---|---|---|---|---|---|
| MEMORY SIDE NI ID | LOCAL BUS FORWARD ROUTE ID | INITIATOR SIDE NI ID | LOCAL BUS BACKWARD ROUTE ID | FLOW'S FORWARD ROUTE ALLOCATION STATUS | FLOW'S DEGREE OF PRIORITY |

| 7 | 8 |
|---|---|
| FLOW'S BACKWARD ROUTE ALLOCATION STATUS | FLOW'S DEGREE OF PRIORITY |

FIG.21

| FLOW ID | | REQUESTED BANDWIDTH (MB/s) | | SELECTION RULE | | START TIME tc (cycle) | REQUESTED SPACE (MB) |
|---|---|---|---|---|---|---|---|
| INITIATOR SIDE NI ID | FLOW NUMBER | FORWARD ROUTE | BACKWARD ROUTE | FORWARD ROUTE | BACKWARD ROUTE | | |
| 2001 | 01 | 100 | 100 | NO LIMITATIONS | | 1000 | 100 |
| 2001 | 02 | 100 | 100 | | | 2000 | 400 |
| 2002 | 01 | 100 | 100 | NO LIMITATIONS | | 3000 | 100 |
| 2002 | 02 | 100 | 100 | | | 4000 | 400 |

FIG. 22

| TRANSFER DIRECTION | TRANSFER ROUTE | REQUESTED BANDWIDTH (MB/s) | | | | |
|---|---|---|---|---|---|---|
| | | tc=0 | tc=1000 | tc=2000 | tc=3000 | tc=4000 |
| FORWARD ROUTE | ROUTE A | 0 | 100 | 100 | 200 | 200 |
| | ROUTE B | 0 | 0 | 100 | 100 | 200 |
| BACKWARD ROUTE | ROUTE A | 0 | 100 | 100 | 200 | 200 |
| | ROUTE B | 0 | 0 | 100 | 100 | 200 |

BUS CONTROLLER, BUS CONTROL SYSTEM AND NETWORK INTERFACE

This is a continuation of International Application No. PCT/JP2013/002973, with an international filing date of May 9, 2013, which claims priority of Japanese Patent Application No. 2012-109835, filed on May 11, 2012, the contents of which are hereby incorporated by reference.

BACKGROUND

1. Technical Field

The present application relates to a technology for controlling communications buses which are implemented as a network on a semiconductor chip.

2. Description of the Related Art

NoC (network-on-chip) is a set of communications buses implemented as a network. A conventional method for distributing transfer data efficiently over an NoC is disclosed in Japanese Patent No. 4796668, for example. FIG. 1 illustrates a configuration for the buses disclosed in Japanese Patent No. 4796668. In FIG. 1, each of transmitting-end functional modules A can choose one of four routes R1 to R4 as a route to transfer data to a receiving-end functional module B. Before transferring data to the receiving-end functional module B, each of the transmitting-end functional modules A gets the respective traffic flow rates of those four routes R1 to R4 from the receiving-end functional module B, and chooses its own data transfer route so that the flow rates of the respective routes R1 to R4 become as uniform as possible. By having each of those transmitting-end functional modules A perform such an operation independently of each other, the imbalance in traffic flow rate between the four routes R1 to R4 can be minimized, and data can be transferred in a broad band with the buses operated at low operating frequencies.

SUMMARY

The prior art technique needs further improvement in view of transferring data more efficiently.

One non-limiting, and exemplary embodiment provides a technique to transfer data more efficiently.

In one general aspect, disclosed herein is a bus controller for use in a bus control system for a semiconductor circuit in which data is transmitted between first and second nodes over a network of buses, the controller being connected directly to the first node and comprising:

a route load detector which detects loads on respective routes that form at least one of a forward route group and a backward route group, the forward route group being comprised of two or more routes leading from the first node to the second node, the backward route group being comprised of two or more routes leading from the second node to the first node;

a candidate route extraction circuit which extracts a candidate route from the at least one group of routes so that loads on the respective routes that form the group become as uniform as possible;

a selection rule storage which stores a predetermined selection rule;

a route determining circuit which determines the route to transmit the data based on the candidate route that has been extracted by the candidate route extraction circuit and the selection rule stored in the selection rule storage;

a header building circuit which generates header information that includes route information indicating the route that has been determined; and a data communication circuit which transmits the data between the first and second nodes through the route that has been designated by reference to the header information.

According to the above aspect, it is possible to transfer data more efficiently.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 4 shows the bandwidths requested for initiators 401 to 404.

FIG. 5 shows how the flow allocation status changes with time.

FIG. 6 shows an exemplary format for a packet header.

FIG. 7 shows an exemplary format for the packet header of a reply packet.

FIG. 9 shows exemplary local bus route selection rules for the NI 413.

FIG. 10 shows examples of information gotten from the respective bandwidth information management circuits on Routes A and B.

FIG. 12 shows exemplary route allocation results that are stored for forward and backward routes.

FIG. 13 shows an exemplary format for the flow related information notification packet.

FIG. 16 shows exemplary route selection rules to be referred to by the NIs 2011, 2012 and 2013.

FIG. 17 shows exemplary pieces of information gotten from the bandwidth information management circuits on Routes A and C when the initiator 2001 issues a request for allocation of the flow 200101.

FIG. 18 shows exemplary pieces of information gotten from the bandwidth information management circuits on Routes A and C when the initiator 2002 issues a request for allocation of the flow 200201.

FIG. 19 shows an exemplary format for a flow related information notification packet.

FIG. 21 shows the properties of flows generated by respective initiators.

FIG. 22 shows exemplary flow allocation states.

DETAILED DESCRIPTION

Figure 1:
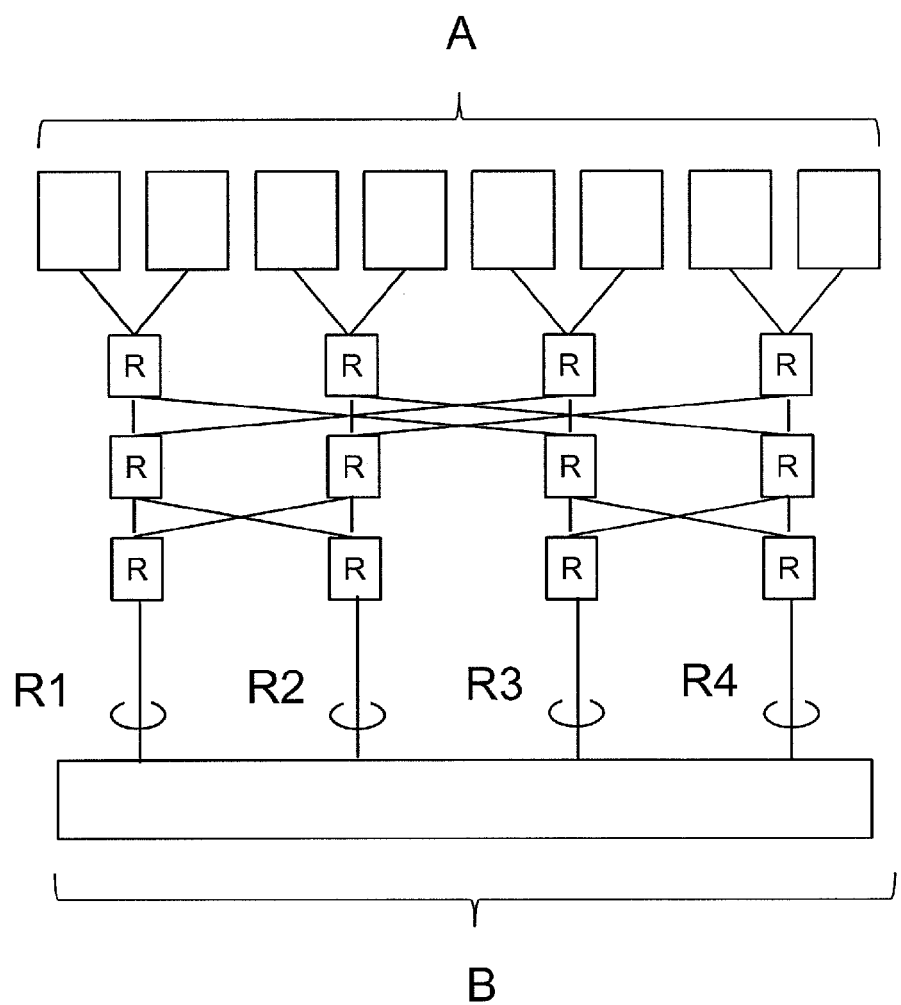
FIG. 1 illustrates a configuration for conventional buses.
Figure 2:
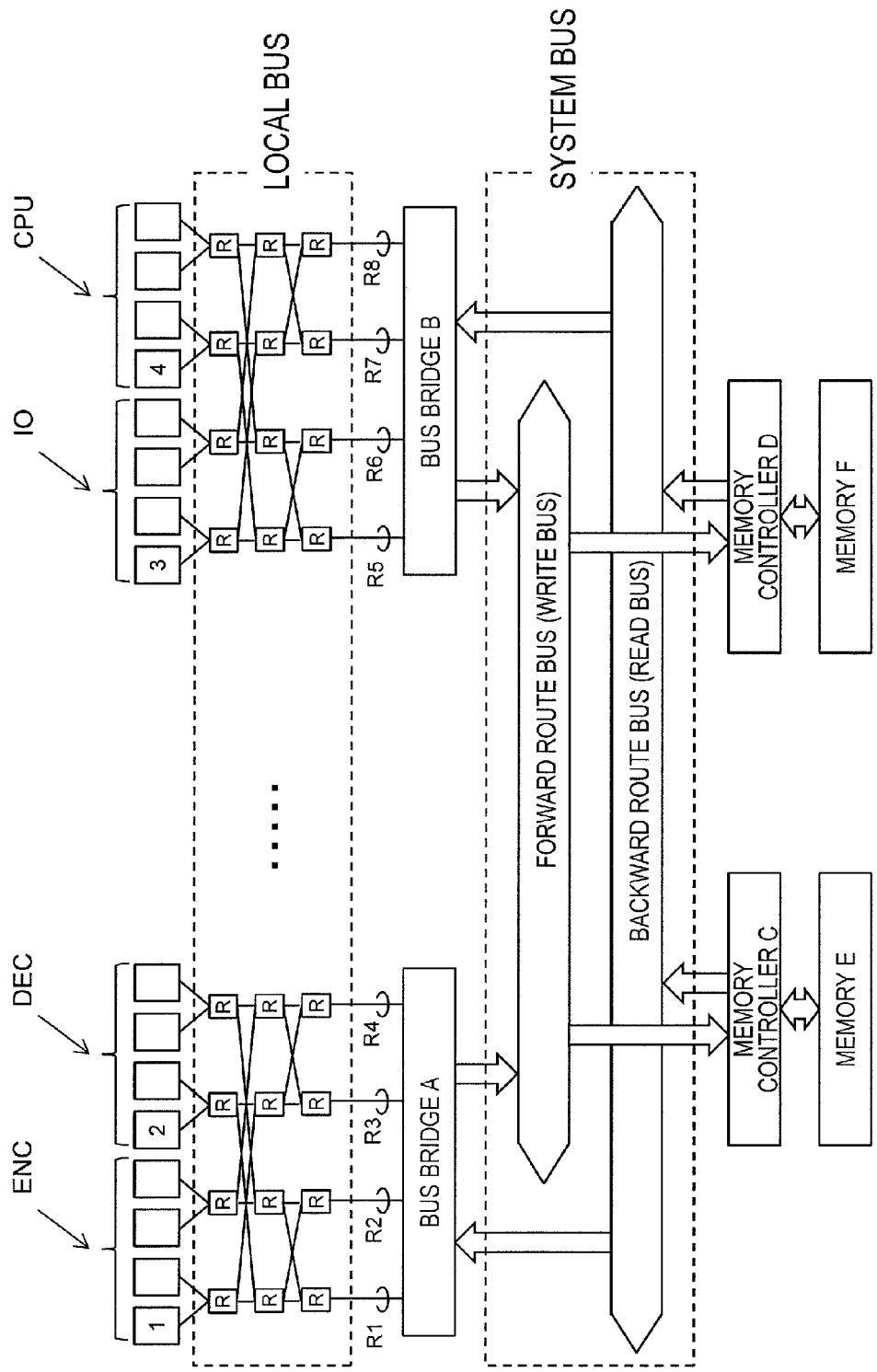
FIG. 2 illustrates a configuration for a general SoC system.

FIG. 2 illustrates a configuration for a general SoC system. As shown in FIG. 2, in a general SoC, a lot of initiators including CPUs as processors, encoding engines ENC and decoding engines DEC as media processing DSPs, IOs as ASICs to input and output data with external devices, and graphic processing ASICs (not shown) are connected to shared memories via a forward bus (write bus) and a backward bus (read bus). A route needs to be allocated to data to be transferred from an initiator to a memory via the forward bus following the order of priorities that has been determined between the initiators during the design process. ENC, DEC, IO and other initiators that need to perform real-time signal processing are rate-ensured types and do not transfer data to memories that operates at higher frequencies than the designed operating range. However, CPU and other non-rate-ensured initiators may need to transfer a huge size of data instantaneously to a memory when a lot of tasks are started in response to the user's operations on the devices or when an internal cache memory is mishit.

If there are non-rate-ensured initiators, the maximum requested bandwidth cannot be defined in advance. For that reason, even if the technique of Japanese Patent No. 4796668 described above is used, data still needs to be transferred even more efficiently.

Recently, in the fields of built-in computers and general-purpose processors that use an SoC (System on Chip), there is a growing demand for semiconductor chips with enhanced performance. And as the performance of a semiconductor chip has been enhanced these days to meet such a demand, the data to be transferred through the communications buses on the chip requires a broader and broader bandwidth, and therefore, the bandwidth of the communications buses themselves, should also be broader and broader. To broaden the bandwidth of the communications buses, the rate of data transferred per unit time may be increased by raising the operating frequency of the buses. If the operating frequency is raised, however, the power dissipation and the required chip area will increase and the layout will get complicated, which is a problem. To broaden the bandwidth of the communications buses without raising the operating frequency, it is effective to get the transfer data loads distributed efficiently on parallel buses by using a number of low-speed communications routes in parallel with each other.

As for a rate-ensured initiator that needs to perform real time processing, a route is suitably selected so that the bandwidths requested become uniform between respective routes. As for a non-rate-ensured initiator, on the other hand, a route is suitably selected and allocated without paying too much attention to the uniformity in bandwidth requested. These selections should be made in order to avoid interference between rate-ensured and non-rate-ensured types and to eliminate mutual interference between non-rate-ensured types. When a forward route is allocated to the buses in this manner, the properties of data to be transferred also need to be taken into account on an initiator basis.

On the other hand, the data to be returned from memory controllers to respective initiators through the backward route has already gone through arbitration on the forward route according to the degrees of priorities between the initiators and has been read out from memories following the result of arbitration. That is why the backward route may be allocated simply to make the returning route bandwidths uniform between those routes. Furthermore, in some cases, bandwidths requested by respective initiators may be separately determined for the forward route (i.e., write bandwidths) and for the backward route (i.e., read bandwidths). In such a situation, by selecting routes so as to provide the bandwidths requested for the forward and backward routes, the bandwidths of the buses can be used sufficiently.

In this case, there are two matters that need to be borne in mind.

Firstly, the scalability should be taken into account with respect to systems, of which the scales are growing year after year. In the example illustrated in FIG. 2, if ENC1 operates as a bus initiator to write data on, and read it from, Memory E, ENC1 gets the respective traffic flow rates of the routes R1 to R4, chooses the best one from these four, and then starts transferring data to Memory E. The selected route is kept on record at the ENC1 end and will be used over and over again, whenever data needs to be transferred to Memory E again. On receiving the data transferred from ENC1, Memory Controller C performs access processing to Memory E and returns the resultant data to ENC1. Before returning the data, Memory Controller C gets the respective traffic flow rates of the routes R1 to R4, chooses the best one from these four, and then starts transferring data to ENC1. The selected route is kept on record at Memory Controller C and will be used a number of times, whenever data needs to be transferred to ENC1 again.

An SoC is generally configured so that a lot of initiators share the same memory. That is why in such a configuration, as the number of those initiators increases, the size of backward route information to be managed by Memory Controller increases, thus causing an increase in the resources of the memory controller and processing load on the memory controller. Furthermore, when the backward route is selected, control information needs to be exchanged to get the respective flow rates of candidate routes, thus causing a delay and an increase in latency to access Memory E. In addition, another buffer needs to be provided to temporarily hold the data that has been read from Memory E, thus causing an increase in the resources of the memory controller and processing load on the memory controller, too. Consequently, there is a growing demand for a configuration that can ensure memory controller scalability on the shared memory end in order to cope with such an increase in the number of initiators.

Secondly, if the number of initiators is changed when the variety of SoCs is expanded, for example, the memory controller that needs to manage the information about the backward route to the initiator is also affected by the change of design, thus causing an increase in the number of design and verification processing steps. Thus, such an increase in the number of design and verification processing steps also needs to be minimized.

The present inventors developed a technique for allocating routes with various properties of transfer data, including differences between forward and backward routes and between rate-ensured and non-rate-ensured types, taken into account.

For example, in a bus control system for a semiconductor circuit in which data is transmitted between first and second nodes over a network of buses, a bus controller according to an embodiment of the present invention is connected directly to the first node and includes: a route load detector which detects loads on respective routes that form at least one of a forward route group and a backward route group, the forward route group being comprised of two or more routes leading from the first node to the second node, the backward route group being comprised of two or more routes leading from the second node to the first node; a candidate route extraction circuit which extracts a candidate route from the at least one group of routes so that loads on the respective routes that form the group become as uniform as possible; a selection rule storage which stores a predetermined selection rule; a route determining circuit which determines the route to transmit the data based on the candidate route that has been extracted by the candidate route extraction circuit and the selection rule stored in the selection rule storage; a header building circuit which generates header information that includes route information indicating the route that has been determined; and a data communication circuit which transmits the data between the first and second nodes through the route that has been designated by reference to the header information.

A bus control system that uses such a bus controller can lower the bus operating frequency on at least one of the forward and backward routes, can cut down the power dissipation and the required chip area easily, and can be laid out easily. In addition, since the forward and backward data transfer routes can be managed on the first node (i.e., initiator) side, the number of design and verification processing steps can also be reduced even when the scale of the system should be increased and when a wider variety of systems of similar types should be developed. On top of that, in a system including a plurality of memories, the rate of memories used can be increased, too.

In order to overcome the problem described above, an aspect of the present invention provides a bus controller for use in a bus control system for a semiconductor circuit in which data is transmitted between first and second nodes over a network of buses. The controller is connected directly to the first node and includes: a route load detector which detects loads on respective routes that form at least one of a forward route group and a backward route group, the forward route group being comprised of two or more routes leading from the first node to the second node, the backward route group being comprised of two or more routes leading from the second node to the first node; a candidate route extraction circuit which extracts a candidate route from the at least one group of routes so that loads on the respective routes that form the group become as uniform as possible; a selection rule storage which stores a predetermined selection rule; a route determining circuit which determines the route to transmit the data based on the candidate route that has been extracted by the candidate route extraction circuit and the selection rule stored in the selection rule storage; a header building circuit which generates header information that includes route information indicating the route that has been determined; and a data communication circuit which transmits the data between the first and second nodes through the route that has been designated by reference to the header information.

In an exemplary embodiment, the route load detector detects, as the route load, a bus' operating bandwidth which is allocated to at least one of the forward and backward route groups.

In another exemplary embodiment, the at least one route group is the forward route group, and the candidate route extraction circuit extracts, as the candidate route, one of the forward routes that has a lighter route load than any other route in the forward route group.

In another exemplary embodiment, the at least one route group is the backward route group, and the candidate route extraction circuit extracts, as the candidate route, one of the backward routes that has a lighter route load than any other route in the backward route group.

In another exemplary embodiment, the selection rule storage stores at least one of a selection rule that imposes no limitations on routes, a selection rule that designates a particular route to use, a selection rule that indicates, if there are multiple flows as data transmission units, in what order those flows are to be used, and a selection rule indicating that this is a non-rate-ensured flow.

In another exemplary embodiment, if the selection rule storage stores a selection rule indicating, when there are multiple flows as data transmission units, in what order those flows are to be used, if another flow route which observes a predetermined order with respect to a new flow has already been determined and if the selection rule indicating the predetermined order of flows is applied to the new flow, the candidate route extraction circuit extracts the same route as that another flow route as the candidate route.

In another exemplary embodiment, if the selection rule storage stores a selection rule indicating that this is a non-rate-ensured flow, if a non-rate-ensured flow route has already been determined and if the selection rule indicating that this is a non-rate-ensured flow is applied to the new flow, the candidate route extraction circuit extracts, as the candidate route, a different route from an existent non-rate-ensured flow route.

In another exemplary embodiment, if the selection rule storage stores a selection rule that designates a particular route to use, and if the selection rule that designates the particular route to use is applied to the new flow, the route determining circuit determines the route designated by the selection rule to be the route to transmit the data, no matter what route has been extracted by the route extraction circuit.

In another exemplary embodiment, if a non-rate-ensured flow route has already been determined, if the selection rule storage stores a selection rule indicating that this is a non-rate-ensured flow, and if the selection rule indicating that this is the non-rate-ensured flow is applied to the new flow, the candidate route extraction circuit extracts, as the candidate route, a different route from an existent non-rate-ensured flow route.

In another exemplary embodiment, the selection rule storage further stores degree of priority information indicating the degrees of priorities of flows at the first node, and the candidate route extraction circuit extracts, as the candidate route, a route to which a flow with a low degree of priority has been allocated by reference to the degree of priority information.

In another exemplary embodiment, the data communication circuit transmits and receives the data on a packet basis, and the header building circuit stores the header information in the header of each packet.

A bus control system according to an exemplary embodiment of the present invention includes: at least one first node; at least one second node; a bus controller according to any of the embodiments described above, which is directly connected to the at least one first node; and a network of buses which form a plurality of routes between the bus controller and the at least one second node. The bus control system transmits data between the at least one first node and the at least one second node over the buses.

In an exemplary embodiment, the bus control system further includes a migrator which exchanges data flows that are allocated to the respective memories. The memories form the at least one second node. A plurality of routes are provided between the at least one first node and the memories. And the migrator exchanges the data flows allocated to the respective memories based on operating bandwidths of the buses that are allocated to the routes and on storage spaces that are used on the respective memories.

In another exemplary embodiment, the routes are arranged as a plurality of buses that are spatially separated from each other in the bus control system.

In another exemplary embodiment, the routes are arranged to form a single signal line on the buses in the bus control system.

In another exemplary embodiment, the routes are formed by subjecting the single signal line on the buses to time division multiplexing in the bus control system.

In another exemplary embodiment, the network of buses includes local buses with the multiple routes and a system bus in the bus control system. The bus control system further includes a bus bridge which connects the local buses and the system bus together.

A network interface according to an embodiment of the present invention is to be used in a bus control system according to any of the embodiments of the present invention described above. The network interface includes: a bandwidth information management circuit which manages bandwidth information that is information about the bandwidth of a flow which is currently allocated as a data transmission unit to an associated route; and a data communication circuit which transmits and receives data from the first node to the second node and vice versa.

In an exemplary embodiment, the bandwidth information management circuit outputs the bandwidth information via the data communication circuit in response to a request from the route load detector of the bus controller which is included in the bus control system.

In another exemplary embodiment, the network interface further includes a backward route header building circuit which generates information designating the backward route by reference to route information that is included in the header information to indicate the backward route and which stores, along with information specifying an address, the backward route designating information in the header of a packet.

Hereinafter, embodiments of a bus controller and communications system according to the present invention will be described with reference to the accompanying drawings. In the following description of embodiments, the bus controller is supposed to be a network interface, and a plurality of nodes which transmit and receive data to/from each other are supposed to be initiators and memories.

Embodiment 1

Figure 3:
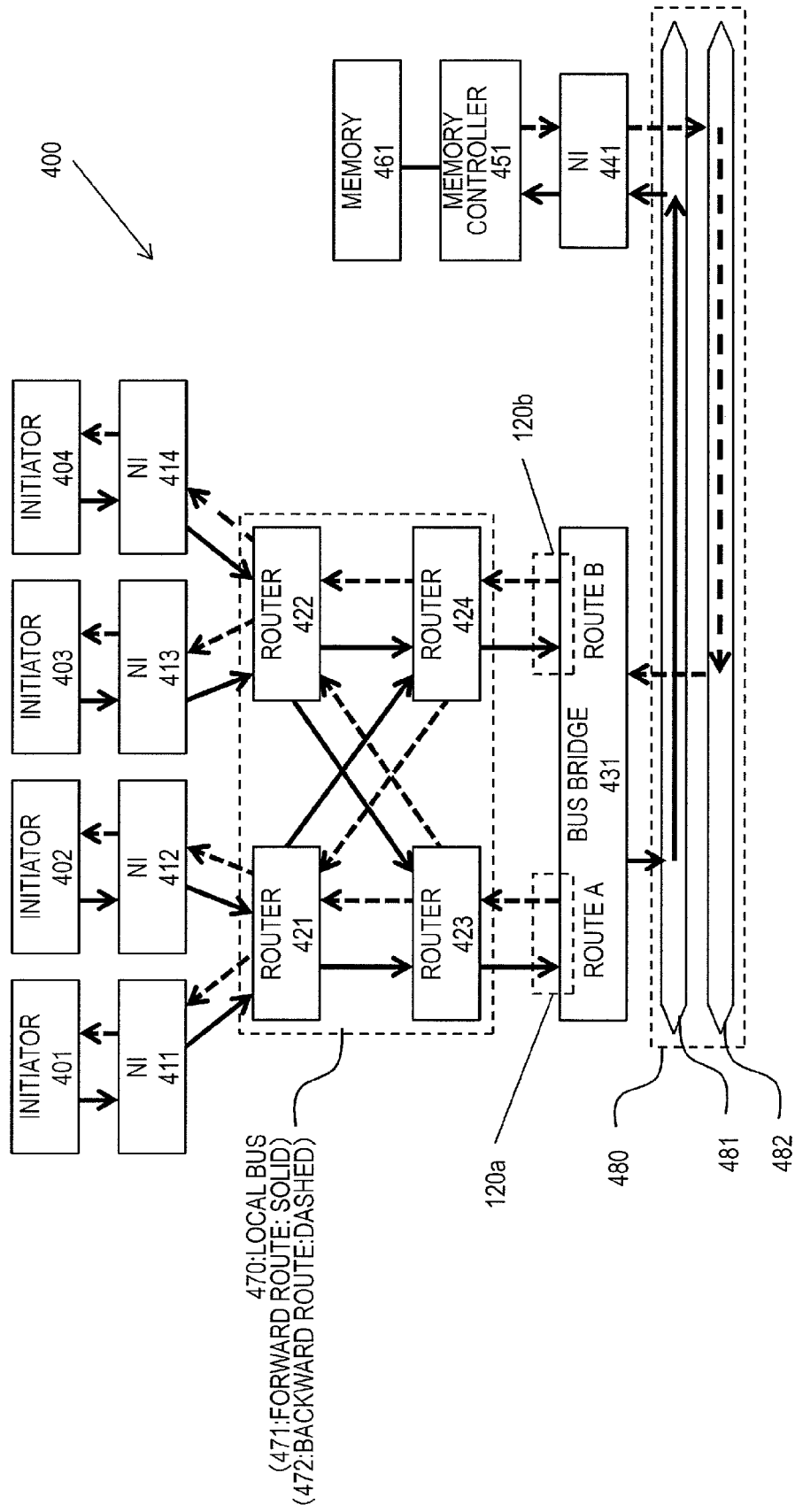
FIG. 3 illustrates an SoC system 400 as an embodiment of the present invention.

FIG. 3 illustrates an SoC system 400 as a first embodiment. Each of initiators 401 to 404 transmits and receives data to/from a shared memory 461 via a local bus 470 and a system bus 480. In NoC buses that form an SoC system, data is transferred on a packet basis through the local and system buses 470 and 480. To transfer the data, these members are connected together in the following manner.

First, the initiators 401 to 404 are connected to the local bus 470 via network interfaces (NIs) 411 to 414, respectively. NIs 411 to 414 are semiconductor circuits or devices used to connect initiators 401 to 404 and the local bus 470, for example. The memory 461 is connected to the system bus 480 via a memory controller 451 and an NI 441. Each NI transfers data by performing packetizing and depacketizing processing.

The local bus 470 and system bus 480 are connected together via a bus bridge 431, which has, on the local bus side, two input/output interfaces that are connected to Routes A and B, respectively.

The local bus 470 is implemented as a network that is formed by routers 421 to 424 so that each of those initiators can choose one of these two Routes A and B in transferring data to the memory 461. The bus bridge 431 includes interfaces 120a and 120b which are associated with Routes A and B, respectively. The configuration of the interfaces 120a and 120b will be described later with reference to FIG. 8.

In the local bus 470, the solid arrows indicate forward route buses 471 to transfer data from the respective initiators to the bus bridge 431, while the dashed arrows indicate backward route buses 472 to return data from the bus bridge 431 to the respective initiators.

The system bus 480 is comprised of a forward route bus 481 to transfer the data from the bus bridge 431 to the memory 461 and a backward route bus 482 to return the data from the memory 461 to the bus bridge 431.

In this embodiment, the system buses 481 and 482 each have a width of 32 bits and operate at 200 MHz, and their connectible bandwidth is 800 MB/s. Meanwhile, the local buses 471 and 472 each have a width of 32 bits and operate at 100 MHz, and their connectible bandwidth is 400 MB/s for both of Routes A and B. Thus, their overall connectible bandwidth is 800 MB/s.

The local bus 470 is configured to operate at a half as high a bus operating frequency as the system bus 480 by using evenly the two routes A and B that operate at a low operating frequency of 100 MHz. Nevertheless, it does not mean that this configuration is adopted to simply double the bus width and half the transfer rate as will be described later. But this configuration is adopted in order to transmit multiple flows through the respective routes independently of each other by enabling the multiple routes to transmit data. By providing those multiple routes, the bus width can be substantially increased and it is possible to avoid a local over concentration of the lines and data to be transmitted through those lines.

FIG. 4 shows the bandwidths requested for the initiators 401 to 404. Each of these requested bandwidths is expressed in megabytes per second. This is not an instantaneous measured value but either a requested bandwidth that was designed on an initiator basis or a requested bandwidth over a relatively long time to be determined on a use case basis for respective devices.

Hereinafter, it will be described generally how to perform a memory access operation using the SoC system 400 with such a configuration.

In this embodiment, the initiators 401, 402, 403 and 404 are supposed to start accessing the memory 461 in this order at times tc of 1000, 2000, 3000 and 4000, respectively. In this description, the time tc is supposed to be a value which starts to be counted when the system is started and which is expressed by the number of cycles with the bus operating frequency used as a reference.

When the system is started at tc=0, no initiators are accessing the memory 461 yet, and therefore, no bandwidths are allocated to any route yet.

FIG. 5 shows how the flow allocation status changes with time. As can be seen from the third column of FIG. 5, all requested bandwidths are zero when tc=0.

When the initiator 401 starts accessing the memory 461 at a time tc=1000, the NI 411 gets the bandwidths to be allocated to the forward and backward routes on Route A and the bandwidths to be allocated to the forward and backward routes on Route B from the bus bridge 431. At this point in time, however, no bandwidths have been allocated yet. That is why a request to allocate 300 MB/s to Route A as the forward route and a request to allocate 100 MB/s to Route A as the backward route are issued with respect to the bus bridge 431. In the fourth columns of FIG. 5, shown are the bandwidths of the respective routes after the bandwidths have been allocated to the initiator 401.

Next, at a time tc=2000, the initiator 402 starts accessing the memory 461, when the NI 412 gets the bandwidths be allocated to the forward and backward routes on Route A and the bandwidths to be allocated to the forward and backward routes on Route B from the bus bridge 431. At this point in time, the bandwidths have been allocated as shown in the fourth column in FIG. 5. That is why in order to make the bandwidths allocated uniform between those two routes, the NI 412 issues a request for allocating a bandwidth of 200 MB/s to Route B as the forward route and a bandwidth of 300 MB/s to Route B as the backward route, respectively. In the fifth columns of FIG. 5, shown are the bandwidths of the respective routes after the bandwidths have been further allocated to the initiator 402.

Subsequently, at a time tc=3000, the initiator 403 starts accessing the memory 461, when the NI 413 gets the bandwidths to be allocated to the forward and backward routes on Route A and the bandwidths to be allocated to the forward and backward routes on Route B from the bus bridge 431. At this point in time, the bandwidths have been allocated as shown in the fifth column in FIG. 5. That is why in order to make the bandwidths allocated uniform between those two routes, the NI 413 issues a request for allocating a bandwidth of 200 MB/s to Route B as the forward route and a bandwidth of 300 MB/s to Route A as the backward route, respectively. In the sixth columns of FIG. 5, shown are the bandwidths of the respective routes after the bandwidths have been further allocated to the initiator 403.

Finally, at a time tc=4000, the initiator 404 starts accessing the memory 461, when the NI 414 gets the bandwidths to be allocated to the forward and backward routes on Route A and the bandwidths to be allocated to the forward and backward routes on Route B from the bus bridge 431. At this point in time, the bandwidths have been allocated as shown in the sixth column in FIG. 5. That is why in order to make the bandwidths allocated uniform between those two routes, the NI 414 issues a request for allocating a bandwidth of 100 MB/s to Route A as the forward route and a bandwidth of 100 MB/s to Route B as the backward route, respectively. In the seventh columns of FIG. 5, shown are the bandwidths of the respective routes after the bandwidths have been further allocated to the initiator 404.

From tc=4000 and on, the sizes of the data transferred through Routes A and B become uniformly distributed on both the forward and backward routes as can be seen from the allocation state shown in the seventh column of FIG. 5. These results of allocation to the forward and backward routes with respect to the respective initiators are kept on record at the NIs which are connected to the respective initiators. And when the transferred data received from the respective initiators is packetized, information about the forward and backward routes is stored in the header of each packet.

FIG. 6 shows an exemplary format for a packet header generated by an NI on the initiator end (as will be described later). Each of the routers 421 to 424 in the local bus transfers a packet using the second field of the packet header as its destination, and each router (not shown) in the system bus transfers a packet using the first field as its destination. When arriving at the NI 441 on the memory end, each packet is de-packetized. And at the same time, a packet header to be added to each packet to be returned through the backward route is generated based on the stored information about the forward route packet header.

FIG. 7 shows an exemplary backward route packet header. The transferred data that has been read out from the memory 461 is packetized using the packet header shown in FIG. 7, and transferred through the system bus backward route 482. The bus bridge 431 which has received the packet through the system bus backward route 482 determines the local bus backward route by reference to the second field of the packet header, and sends out a reply packet through the local bus backward route 472. The reply packet is transferred to the destination specified by the first field of the packet header, delivered to the NI on the initiator end, de-packetized, and then passed to the initiator, thereby completing the memory access.

Figure 8:
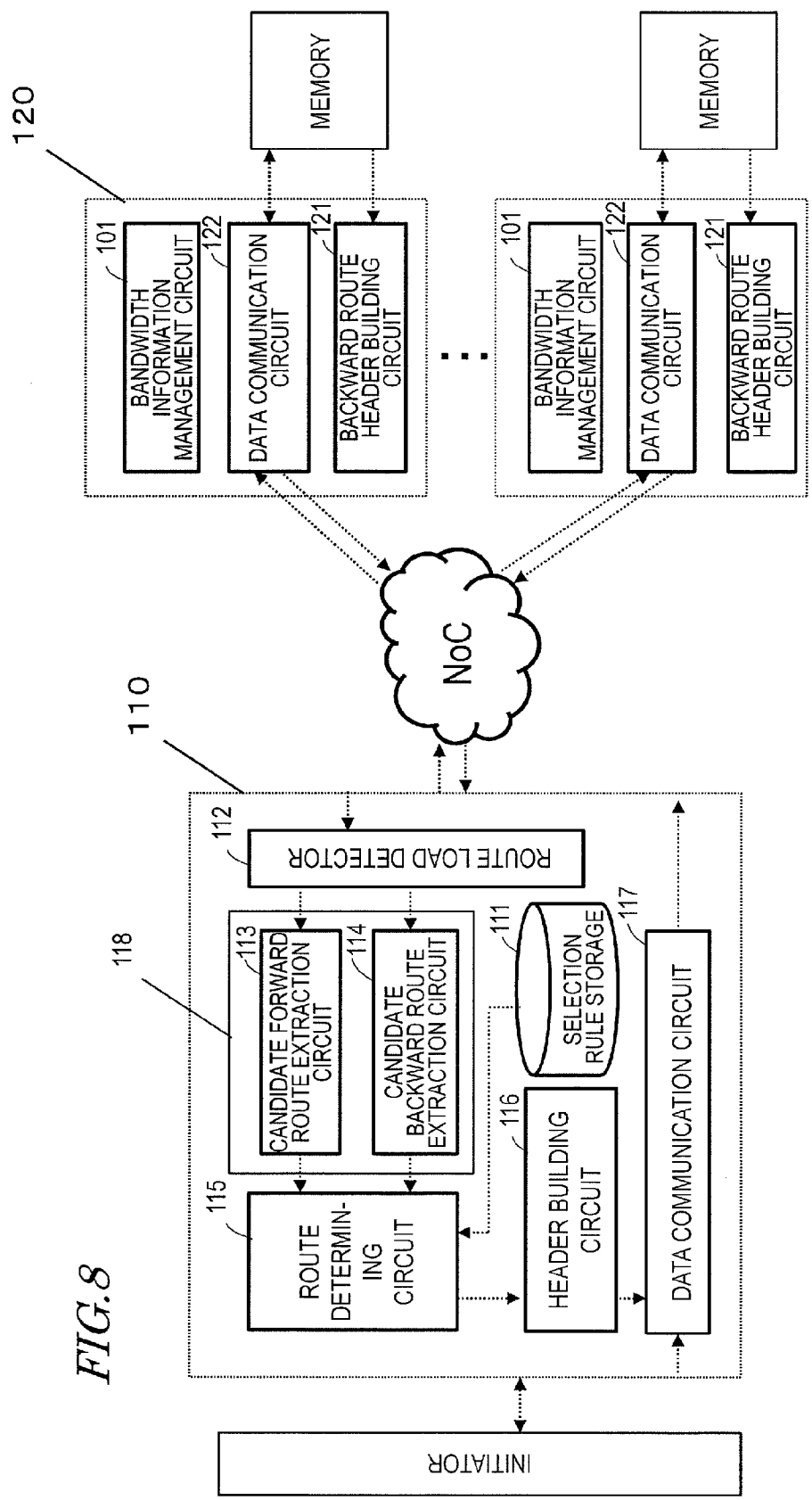
FIG. 8 illustrates mainly an exemplary configuration for a network interface (NI) 110 on the initiator end.

FIG. 8 illustrates an exemplary configuration for the network interface (NI) 110 on the initiator end. This NI 110 is an interface to be directly connected to the initiator, and corresponds to the NIs 411 to 414 shown in FIG. 3. In the example to be described below, the NI 110 is supposed to be the NI 413 shown in FIG. 3.

The NI 110 includes a selection rule storage 111, a route load detector 112, a route determining circuit 115, a header building circuit 116, a data communication circuit 117, and a candidate route extraction circuit 118. Hereinafter, the respective components of the NI 110 and their operations will be described in detail.

In the embodiment to be described below, the loads are supposed to be distributed both on the forward route leading from an initiator as the first node to a memory as the second node and on the backward route leading from the memory to the initiator. However, the loads may be distributed on only the forward route or the backward route. That is to say, according to this embodiment, the loads are supposed to be distributed on at least one of the forward and backward routes. The same statement will apply to any of the other embodiments to which the description of this embodiment is incorporated.

(Selection Rule Storage 111)

The selection rule storage 111 is a storage device which stores a selection rule to be used to select a route between each initiator and its target memory.

FIG. 9 shows exemplary local bus route selection rules for the NI 413. On the first column, shown is a unique ID (which is a numeral string in this embodiment) given by the system to the NI 413. On the second column, shown are the numbers to identify flows from the initiator 401. By combining the numeral string ID on the first column with one of the flow numbers on the second column, a flow ID can be obtained as an identifier to identify a flow uniquely on the system. In this embodiment, the flow ID may be represented as "41301", "41302", and so on.

In this description, the "flow" represents the unit of a requested bandwidth when a memory needs to be accessed during a design process or an operation. For example, suppose the initiator 403 is a codec engine, the encoding processing task is given a requested bandwidth of 200 MB/s for the forward route and a requested bandwidth of 300 MB/s for the backward route, and the decoding processing task is given a requested bandwidth of 100 MB/s for each of the forward and backward routes. In that case, these two tasks correspond to two flows from the initiator.

The third and fourth columns indicate the selection rules to be applied when a forward route is allocated to the local buses and when a backward route is allocated to the local buses, respectively. For example, according to the selection rule applied to the flow with the flow ID "41301", the "no limitations" rule is applied to this flow for both of the forward and backward routes, and no limitations are imposed on the routes, either. This means that any of Route A and B can be allocated so that the data transfer rate becomes uniform between the routes.

As another example, the selection rule applied to the flow with the flow ID "41302" says that both of the forward and backward routes are fixed at Route B and Route A is not selected. This rule is applicable effectively to a situation where there are other non-rate-ensured initiators, of which the average requested bandwidth has already been designed but the maximum requested bandwidth needs to be no greater than the bus' physical bandwidth, on the system. If a plurality of initiators selected the same route, the maximum requested bandwidth would interfere with each other and the performance of the initiator could steeply decline instantaneously. However, by applying the rule of fixing a flow route, such a decline in performance can be avoided. In such a situation, a selection rule of fixing both of the forward and backward routes at Route A may be applied to the one non-rate-ensured initiator, and a selection rule of fixing both of the forward and backward routes at Route B may be applied to the other non-rate-ensured initiator.

On the other hand, if there is any initiator, of which the memory access latency is very short, on the system, a particular preferential route, to which only a limited bandwidth is allocated, may be provided and may be used as a selection rule when the route to be allocated to the initiator is fixed at that route.

The selection rules applied to the flows with flow IDs "41303" and "41304" say that packets returning from any memory on these two flows need to arrive at the initiator 403 in only the designated order. The flows may be registered with this selection rule storage 111 by the initiator either as a part of initialization processing before the system is started or before the system's operation is switched or when each flow starts running.

(Route Load Detector 112)

The route load detector 112 is, for example, a circuit which requests bandwidth information from a bandwidth information management circuit 101 on each of the candidate routes, and gets the current bandwidth allocation status on a route-by-route basis that has been transmitted from the bandwidth information management circuit 101 via the data communication circuit 122. The bandwidth allocation status is gotten at a time when a request to start transmitting a flow is received from the initiator.

FIG. 10 shows examples of information gotten from the respective bandwidth information management circuits on Routes A and B. As shown in FIG. 10, as for the encoding processing task flow associated with the NI 413, a bandwidth of 200 MB/s and a bandwidth of 300 MB/s have already been allocated to forward and backward routes, respectively, when Route B is adopted. The bandwidth information may be gotten from the bandwidth information management circuit 101 either by exchanging control packets on the buses or by making a handshake of a dedicated control signal. If the bandwidth information needs to be gotten by exchanging control packets on the buses, the control packets may be transmitted as either unicast packets or broadcast packets from the NI 413 to the bandwidth information management circuits on the respective routes. Also, a control packet for getting forward route bandwidth information and a control packet for getting backward route bandwidth information may be processed either as the same control packet or as two different control packets.

(Candidate Route Extraction Circuit 118)

The candidate route extraction circuit 118 is, for example, a circuit which extracts a candidate route from a group of forward routes and/or a group of backward routes so that loads on the respective routes that form the group become as uniform as possible. When the candidate route is extracted, information about loads on various routes that have been obtained by the route load detector 112 is used.

In this description, the phrase "so that loads on the respective routes that form the group become as uniform as possible" will be used herein in the following sense. Specifically, this phrase means reducing the difference in load in the overall group of routes as much as possible when a bandwidth is going to be newly allocated in a situation where a bandwidth has already been allocated to at least one group of routes. The bandwidth has only to be allocated so that the difference in load is minimized in the overall group of routes. Ideally, there should be no difference in load in the group of routes. Actually, however, there is a difference in load there. But the presence of such a difference in load is tolerated. It should be noted that the phrase "make something uniform" in "make the flow's bandwidth uniform" also means "reducing the difference in load in the overall group of routes" and does not mean "eliminating the difference in load completely".

The candidate route extraction circuit 118 includes a candidate forward route extraction circuit 113 and a candidate backward route extraction circuit 114. As for the forward route, the candidate forward route extraction circuit 113 extracts a candidate route. As for the backward route, on the other hand, the candidate backward route extraction circuit 114 extracts a candidate route.

(Candidate Forward Route Extraction Circuit 113)

The candidate forward route extraction circuit 113 is, for example, a circuit which calculates the forward route allocated bandwidth value $E_{ij}$ for a route i, to which a flow j has been allocated, based on the route-by-route forward route allocated bandwidth value $U_i$ and the forward route requested bandwidth value $u_j$ of the flow j to be allocated that the route load detector 112 has obtained from the bandwidth information management circuit 101. In the following Equation (1), "fwd" is a superscript indicating the forward route:

$$E^{fwd}_{ij} = U^{fwd}_i + u^{fwd}_j \qquad (1)$$

In this case, examples of the forward route allocated bandwidth values $U_i$ are shown in FIG. 10.

The candidate forward route extraction circuit 113 calculates $E_{ij}$ for every candidate route and selects a route $R_j$, of which the $E_{ij}$ value has turned out to be smaller than any other route's, as a candidate forward route to be allocated to the flow j:

$$R^{fwd}_j = \text{index } i \text{ of}(\min \{E^{fwd}_{ij}\}) \qquad (2)$$

(Candidate Backward Route Extraction Circuit 114)

The candidate backward route extraction circuit 114 is, for example, a circuit which calculates the backward route allocated bandwidth value $E_{ij}$ for a route i, to which a flow j has been allocated, based on the route-by-route backward route allocated bandwidth value $U_i$ and the backward route requested bandwidth value $u_j$ of the flow j to be allocated that the route load detector 112 has obtained from the bandwidth information management circuit 101. In the following Equation (3), "back" is a superscript indicating the backward route:

$$E^{back}_{ij} = U^{back}_i u^{back}_j \qquad (3)$$

In this case, examples of the backward route allocated bandwidth values $U_i$ are shown in FIG. 10.

The candidate backward route extraction circuit 114 calculates $E_{ij}$ for every candidate route and selects a route $R_j$, of which the $E_{ij}$ value has turned out to be smaller than any other route's, as a candidate backward route to be allocated to the flow j:

$$R^{back}_j = \text{index } i \text{ of}(\min \{E^{back}_{ij}\}) \qquad (4)$$

(Route Determining Circuit 115)

The route determining circuit 115 is, for example, a circuit which detects a flow start request issued by the initiator 413, and searches the selection rule storage 111 using the flow ID as a search key, thereby extracting a route selection rule on the flow. For example, as for the flow with the flow ID "41301" (see FIG. 9), the route determining circuit 115 makes the route load detector 112 get bandwidth information, thereby getting the results that have been obtained by the candidate forward route extraction circuit 113 and the candidate backward route extraction circuit 114. Since the forward route selection rule of that flow says "no limitations", one of the routes provided by the candidate forward route extraction circuit 113 which has produced the highest degree of uniformity between the bandwidths allocated to the respective forward routes is determined as the route to be allocated to the forward route. Likewise, since the backward route selection rule also says "no limitations", one of the routes provided by the candidate backward route extraction circuit 114 which has produced the highest degree of uniformity between the bandwidths allocated to the respective backward routes is determined as the route to be allocated to the backward route. As for that flow, there are no limitations on the selection rule for both of the forward and backward routes. That is why routes that make the bandwidths allocated as uniform as possible are selected independently of each other. Meanwhile, as for the flow with the flow ID "41302" (see FIG. 9), the selection rule says that the routes to be allocated are fixed for both of the forward and backward routes. Thus, there is no need to get any bandwidth information and the designated route is determined to be the allocated route for both of the forward and backward routes.

As for the flows with the flow IDs "41303" and "41304" (see FIG. 9), there are no limitations on the selection rule for the forward route but the selection rule for the backward route indicates that the route be selected under the condition that the order of arrival of reply packets should not collapse between the flows. The latter situation arises when a single flow which needs to be accessed only in a specified order is transmitted through two routes in parallel with each other in order to secure a transmission bandwidth.

It should be noted that once the origin (or source) and target (or destination) have been set, the NoC of this embodiment is configured to determine uniquely the router to relay the data. For that reason, according to this embodiment, once the order of sending packets has been determined, that order can be maintained. It should be noted that this "target" is not the memory that is the final address to which the packets should be sent but a bus bridge route interface.

Figure 11:
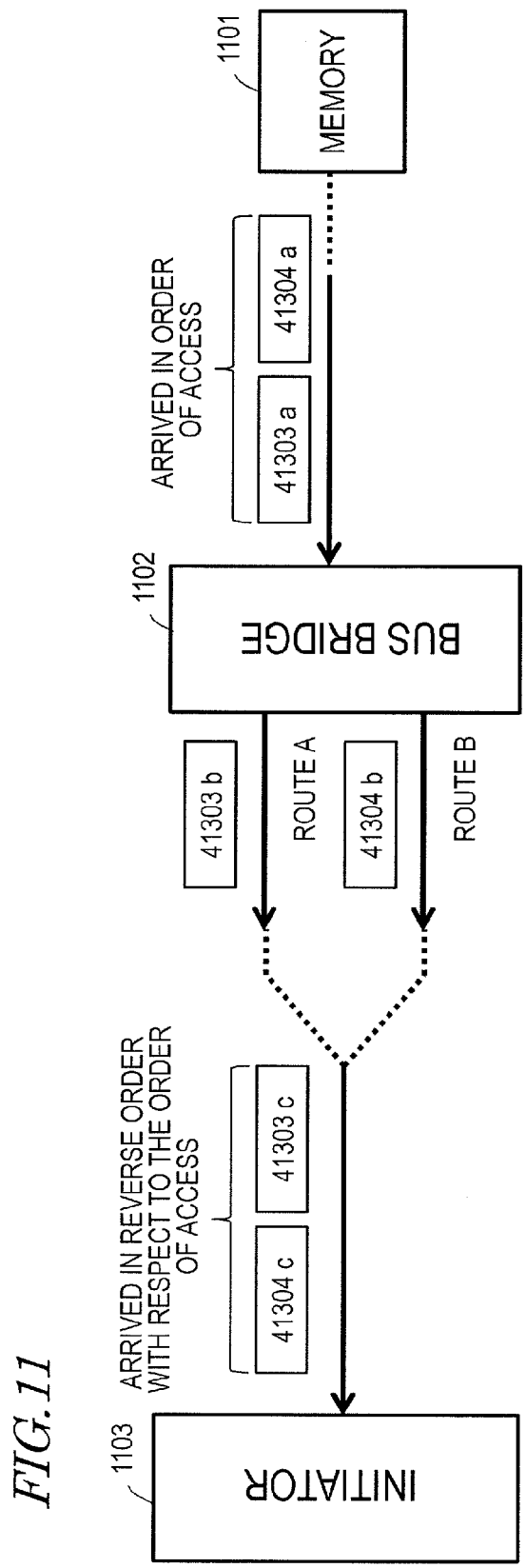
FIG. 11 illustrates an exemplary route allocation failure that has caused the order of arrival of packets to collapse between two flows.

FIG. 11 illustrates an exemplary route allocation failure that has caused the order of arrival of packets to collapse between two flows. Reply packets 41303a and 41304a belonging to flows 41303 and 41304 that have come from a memory 1101 arrive at a bus bridge 1102 while observing their order of access. If Routes A and B are respectively allocated to these flows 41303 and 41304 on the local bus backward routes and if packets are transferred more quickly through Route B than through Route A, then the packets 41304c and 41303c will arrive at an initiator 1103 in this order, which is reverse to the order of access. That is why such allocation state is prohibited following the selection rule on these flows. Specifically, if allocation to the flow 41303 has occurred earlier than allocation to the flow 41304, then forward and backward routes will be selected independently of each other just like the flow 41301. And when allocation to the flow 41304 occurs after that, the forward route is determined based on the forward route allocated bandwidth just like the forward route for the flow 41301. In allocating the backward route, on the other hand, the backward route that has already been allocated to its associated flow 41303 is determined to be the backward route to be allocated to the flow 41304 without relying on the backward route allocated bandwidth of each route. In this manner, it is possible to prevent the packets from arriving at the initiator in reverse order due to a difference in data transfer timing between Routes A and B. The forward and backward routes that have been allocated to respective flows following the selection rules are kept on record by the route determining circuit 115. And when the memory belonging to each flow is accessed, the header building circuit 116 refers to the route allocation results and uses them to generate a packet header.

FIG. 12 shows exemplary route allocation results that are stored for forward and backward routes. After having allocated forward and backward routes to the flow, the route determining circuit 115 notifies the bandwidth information management circuit 101 on that allocated route of flow related information, which is information about the flow to which the routes have been allocated. The flow related information includes at least information about the requested bandwidth of that flow.

FIG. 13 shows an exemplary format for the flow related information notification packet. Since the packet is not a memory access request packet, NULL is stored as memory side NI ID in the field on the first column. The ID of the forward route that has been allocated is stored in the field on the second column. The ID of the initiator side NI that is the origin is stored in the field on the third column. The ID of the backward route that has been allocated is stored in the field on the fourth column. A value indicating the requested bandwidth that has been allocated to the forward route is stored in the field on the fifth column. And a value indicating the requested bandwidth that has been allocated to the backward route is stored in the field on the sixth column. By transferring information about these requested bandwidths to the bandwidth information management circuit 101 using these packets, the bandwidth information management circuit 101 on each route can manage the requested bandwidth of every flow that has been allocated to the route.

On completing the memory access, the route determining circuit 115 outputs a forward and backward route deallocate instruction. In accordance with this instruction, the bandwidth information management circuit 101 deallocate the flows from the forward and backward routes and updates the respective values of the forward and backward route allocated bandwidths.

(Header Building Circuit 116)

By reference to the flow-by-flow forward and backward route allocation results that are stored in the route determining circuit 115, the header building circuit 116 is, for example, a circuit which builds the packet header of a memory access request packet to be sent to the memory.

FIG. 6 shows an exemplary format for the packet header.

In the first packet field on the first column, stored is a value indicating the ID of the target memory to be accessed. The ID of the target memory may be received every time the initiator 403 outputs a memory access request to the NI 413. Alternatively, a conversion table for converting the address of the memory to be accessed into the ID of the target memory may be retained in the NI 413 and referred to.

In the second packet field on the second column, stored is a value indicating the result of forward route allocation. FIG. 12 shows exemplary route allocation results. The header building circuit 116 searches the storage area of the route allocation results shown in FIG. 12 using the flow ID, thereby extracting a value indicating the forward route allocation result and storing the value in the second packet field on the second column.

In the third packet field on the third column, stored is the ID of the initiator 403. The ID of the initiator 403 may be set using a register with respect to the NI 413 while the NI 413 is being initialized. Alternatively, a unique ID of the NI 413 may be stored in advance in the NI 413 in the system. In the fourth packet field on the fourth column, stored is a value indicating the backward route allocation result that has been extracted by searching the storage area of the route allocation results shown in FIG. 12 using the flow ID. Optionally, any other pieces of information to be required by the system may also be stored in additional fields in the header.

(Data Communication Circuit 117)

On receiving a memory access request (which is either a write request or a read request) from the initiator 403, the data communication circuit 117 finds the flow ID of the access and notifies the header building circuit 116 of the ID, thereby getting the packet header of an access request packet to be sent to the memory. On the other hand, on receiving write data from the initiator 403, the data communication circuit 117 sends not only the packet header but also the request packet to the router 422 on the first stage. Also, on receiving a reply packet from the router 422, the data communication circuit 117 removes the packet header from the reply packet. And on receiving read data, the data communication circuit 117 sends it to the initiator 403. In transmitting and receiving data to/from the initiator 403, the data communication circuit 117 converts it, as needed, into a bus protocol with which the initiator is compliant.

Now take a look at FIGS. 8 and 3.

The memory side interface 120 shown in FIG. 8 is an exemplary configuration for the NI 441 shown in FIG. 3. Also, as shown in FIG. 8, if there are multiple memories, multiple memory side interfaces 120 are provided, too. That is to say, if there are multiple different routes, the interface is provided for each of those routes.

For the same reason, two interfaces 120, each having the same configuration as the memory side interface 120, are provided as interfaces 120a and 120b for Routes A and B, respectively, as shown in FIG. 3. In the following description, the interface 120 shown in FIG. 8 is supposed to correspond to the NI 441 shown in FIG. 3. It should be noted, however, that the interfaces 120a and 120b (see FIG. 3) also have the same configuration.

The memory side interface 120 includes a bandwidth information management circuit 101, a backward route header building circuit 121, and a data communication circuit 122. Hereinafter, the respective components and operation of the memory side interface 120 will be described in detail.

(Backward Route Header Building Circuit 121)

The backward route header building circuit 121 builds the respective packet headers of reply packets that store the memory access results based on the packet headers of memory access request packets that have been received from the NIs 411 to 414 on the initiator side. As the routes allocated to the reply packets in the local buses are managed in the NIs 411 to 414 on the initiator side, information about the backward routes that the reply packets should take is stored in the packet headers of the request packets and then the memory side NI 441 is notified of that information.

FIG. 7 shows a format for the packet header of a reply packet. In the first column field of the reply packet, stored is the ID of the initiator side NI, which is the final destination of the reply packet and which has been copied from the third column field of the packet header of the request packet shown in FIG. 6. In the second column field of the reply packet, stored is the ID indicating the local bus backward route, which has been copied from the fourth column field of the request packet. In the third column field of the reply packet, stored is the ID of the memory side NI 441, which is the source of the reply packet and which is the same value as the first column field of the request packet. And in the fourth column field of the reply packet, stored is the ID of the local bus forward route, which has been copied from the second field of the request packet. It should be noted that as information about the local bus forward route is not needed on the backward route, there is no need to provide the field to store the ID of the local bus forward route.

(Data Communication Circuit 122)

The data communication circuit 122 receives the request packets through the system bus forward route 481, removes the packet header from each of the request packets, and then transmits either write data or a read request to the memory controller 451. Also, the data communication circuit 122 notifies the backward route header building circuit 121 of the packet header that has been removed from the request packet header. Also, if a reply to a request to access to the memory 461 (i.e., a reply to a write or read request) has been received from the memory controller 451, the data communication circuit 122 gets the packet header of the reply packet from the backward route header building circuit 121, generates a reply packet by combining the packet header with the reply to the access request, and sends the reply packet to the initiator through the system bus backward route 482. As for transmitting or receiving data to/from the memory controller 451, the data communication circuit communication circuit 122 converts the data, as needed, into a bus protocol with which the memory controller 451 is compliant.

(Bandwidth Information Management Circuit 101)

In this embodiment, the bandwidth information management circuit bandwidth information management circuit 101 is supposed to be provided on the local bus side interface of the bus bridge 431. However, the bandwidth information management circuit 101 may be arranged anywhere else on the route as long as the bandwidth information of each route can be managed there. The bandwidth information management circuit 101 on the route i manages the allocated bandwidth value $U_i$ of the flow that is currently allocated to the route i and updates $U_i$ in accordance with the allocation result notification that has been received from the route determining circuit 115. In a state where no flows have been allocated yet (e.g., when the system is started), the allocated bandwidth value $U_i$ is initialized by the following Equations (6) and (6), where "fwd" and "back" are superscripts indicating the forward route and backward route, respectively:

$$U^{fwd}_i = 0 \quad (5)$$

$$U^{back}_i = 0 \quad (6)$$

FIG. 13 shows an exemplary allocation result notification packet received from the route determining circuit 115 when the allocation processing gets done on the flow j. If the forward route ID stored in the second column of the packet is associated with the route i managed by the bandwidth information management circuit 101, the allocated bandwidth value $U_i$ is updated by the following Equation (7) using the forward route allocated bandwidth value $u_j$ of the flow j that is stored in the fifth column field of the packet.

$$U^{fwd}_i = U^{fwd}_i + u^{fwd}_j \quad (7)$$

If the backward route ID stored in the fourth column of the packet is associated with the route i managed by the bandwidth information management circuit 101, the allocated bandwidth value $U_i$ is updated by the following Equation (8) using the backward route allocated bandwidth value $u_j$ of the flow j that is stored in the sixth column field of the packet.

$$U^{back}_i = U^{back}_i + u^{back}_j \quad (8)$$

On the other hand, if the flow j that has been allocated to the route i has disappeared due to a change of the state of the initiator, for example, the allocated bandwidth value $U_i$ is updated by the following Equations (9) and (10) in response to the allocated bandwidth deallocate notification received from the route determining circuit 115.

$$U^{fwd}_i = U^{fwd}_i - u^{fwd}_j \quad (9)$$

$$U^{back}_i = U^{back}_i - u^{back}_j \quad (10)$$

By constantly updating the allocated bandwidth value $U_i$ as a flow is allocated to, and deallocated from, the route i, the bandwidth information management circuit 101 can manage the requested bandwidth allocated to the forward and backward routes of the route i. At the request from the route load detector 112, the bandwidth information management circuit 101 provides the allocated bandwidth value $U_i$.

Figure 14:
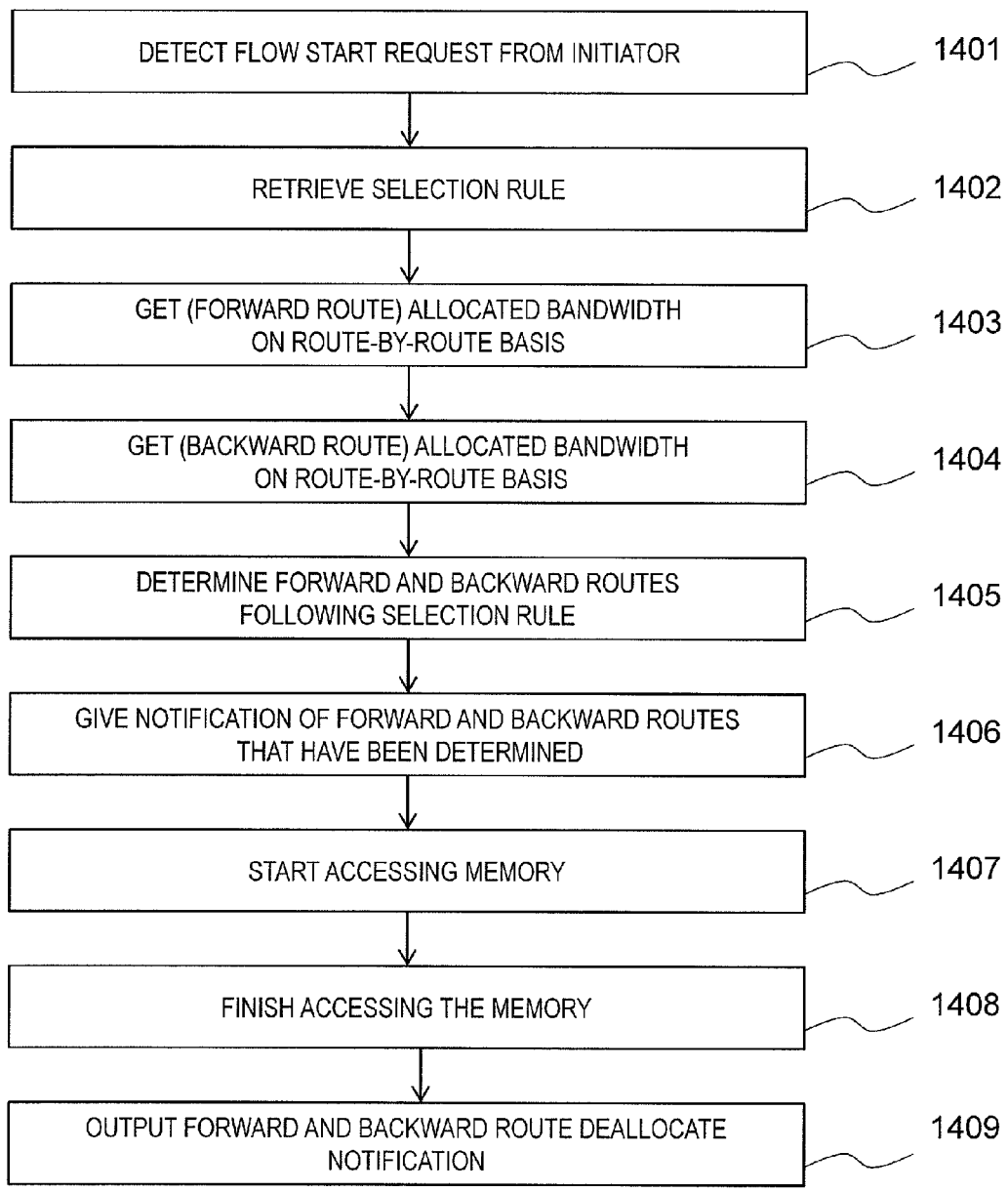
FIG. 14 shows the flow of the processing to be performed by the NI on the initiator side according to a first embodiment as an example of the present invention.

FIG. 14 shows the flow of the processing to be performed by the NI on the initiator side according to this embodiment. First of all, in Step S1401, the route determining circuit 115 detects a flow start request from an initiator. Next, in Step S1402, the route determining circuit 115 retrieves a selection rule from the selection rule storage 111.

Subsequently, in Step S1403, the candidate forward route extraction circuit 113 gets (forward route) allocated bandwidth on a route-by-route basis. Specifically, the candidate forward route extraction circuit 113 calculates, by Equation (1), the forward route allocated bandwidth value $E_{ij}$ for a route i, to which a flow j has been allocated, based on the route-by-route forward route allocated bandwidth value $U_i$ and the forward route requested bandwidth value $u_j$ of the flow j to be allocated that the route load detector 112 has obtained from the bandwidth information management circuit 101.

Meanwhile, in Step S1404, the candidate backward route extraction circuit 114 gets (backward route) allocated bandwidth on a route-by-route basis. Specifically, the candidate backward route extraction circuit 114 calculates the backward route allocated bandwidth value $E_{ij}$ for a route i, to which a flow j has been allocated, based on the route-by-route backward route allocated bandwidth value $U_i$ and the backward route requested bandwidth value $u_j$ of the flow j to be allocated that the route load detector 112 has obtained from the bandwidth information management circuit 101.

Next, in Step S1405, the route determining circuit 115 gets the results that have been obtained by the candidate forward route extraction circuit 113 and the candidate backward route extraction circuit 114 and searches the selection rule storage 111, thereby determining forward and backward routes following the selection rule.

Then, in Step S1406, the route determining circuit 115 notifies the bandwidth information management circuit 101 of the memory side interface 120 on the allocated route of the forward and backward routes that have been determined.

Thereafter, the memory access is started in Step S1407 and ended in Step S1408.

Finally, in Step S1409, the route determining circuit 115 outputs a forward and backward route deallocate notification. As a result, the bandwidth information management circuit 101 deallocates flows from the forward and backward routes and updates the respective values of the forward and backward route allocated bandwidths.

In the embodiment described above, the destination to which data is transferred from an initiator is supposed to be a system memory. However, the destination may also be a local memory, a graphic memory, an input/output port, a buffer, a device, or even the receiving end of direct communication between two initiators. For example, if communications are supposed to be done directly between the initiators 401 and 404 within the local buses without passing through the memory 461, the ID of the initiator side NI 414 may be specified as the destination of the packet. In that case, the request packet sent from the NI 411 is looped back by the bus bridge 431 and sent to the NI 414. On the other hand, the reply packet sent from the NI 414 is looped back by the bus bridge 431 and sent back to the NI 411. Even in the case of direct communications, the flow may also be allocated in the same way as in the route allocation processing to be performed on the memory access flow. By adopting such a configuration, the bandwidths used by the buses can be optimized both on the forward and backward routes, and broadband data can be transferred using parallel buses with a low bus operating frequency.

Embodiment 2

In the first embodiment described above, the maximum requested bandwidth value $u_j$ of the flow j generated by each initiator is supposed to be definable. Even though its granularity varies according to the method of designing the bandwidth for an SoC, the maximum requested bandwidth of each flow may be regarded as one of design parameters to be defined during the design process as for a rate-ensured initiator because the memory access performance needs to be ensured.

However, when an SoC system is actually configured, there are some non-rate-ensured initiators that do not care about the processor's performance or memory access performance. In some cases, an average requested bandwidth can be defined for a non-rate-ensured initiator. Nevertheless, if a lot of tasks have been started in response to the user's operation of the device or if an internal cache memory has been mishit, a memory is sometimes required to transfer a huge size of data instantaneously. In such a situation, the upper limit of the maximum requested bandwidth will be defined by the physical bandwidth of the bus.

Thus, in order to prevent such a non-rate-ensured broadband memory access from interfering with the real-time initiator's memory access, of which the performance needs to be ensured, according to this embodiment, the bus' bandwidth is subjected to time division multiplexing or the degrees of priorities are controlled when packets are transferred through routers.

Figure 15:
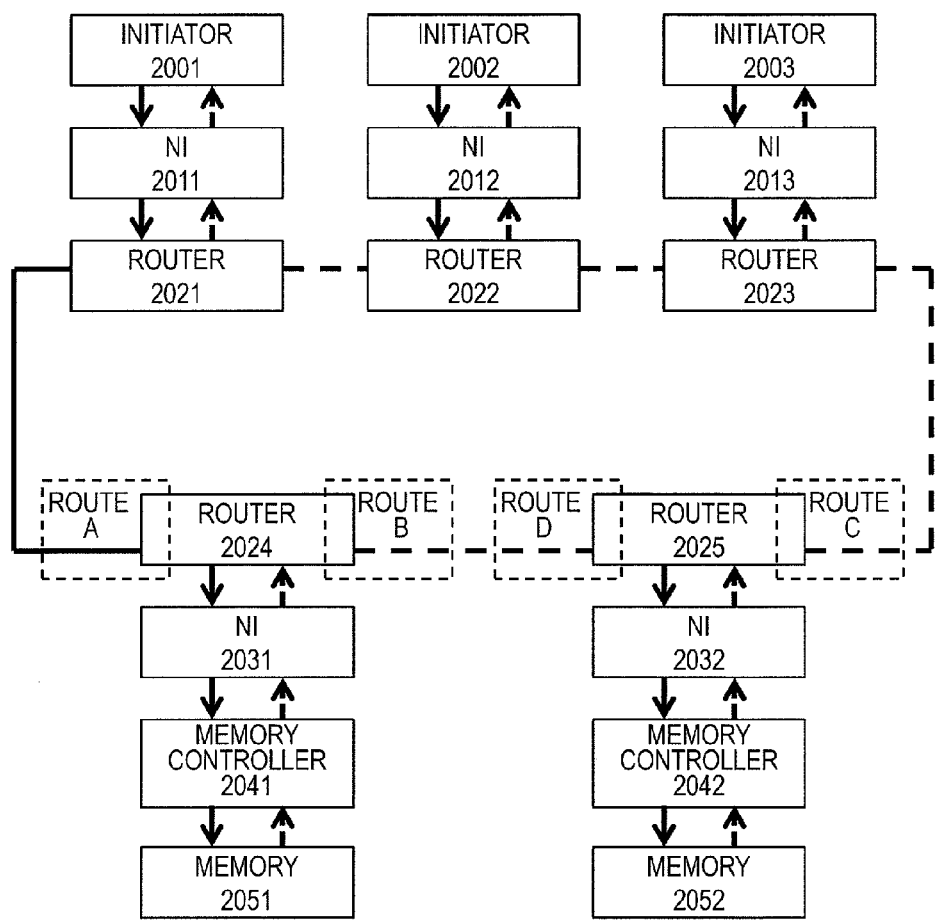
FIG. 15 illustrates an SoC system according to a second embodiment as another example of the present invention.

FIG. 15 illustrates an SoC system according to this embodiment.

Each of the initiators 2001 to 2003 is a non-rate-ensured initiator. Although no real-time initiators are shown in FIG. 15, some initiators of that type may be present on the system if the time division multiplexing is carried out on the bandwidth or if the degrees of priorities of packets are controlled.

The non-rate-ensured initiators 2001 to 2003 send and receive data to/from shared memories 2051 and 2052 through buses. The initiators 2001, 2002 and 2003 are connected to routers 2021, 2022 and 2023 via network interfaces (NIs) 2011, 2012 and 2013, respectively. The memories 2051 and 2052 are connected to routers 2024 and 2025 via memory controllers 2041 and 2042 and network interfaces (NIs) 2031 and 2032, respectively. The routers 2021 to 2025 form a bus in which each pair of adjacent routers is connected together.

Each of the initiators 2001, 2002 and 2003 can access any of the memories 2051 and 2052. For example, if the initiator 2001 needs to access the memory 2051, the initiator 2001 can take either Route A leading to the memory 2051 via one of the two interfaces of the router 2024 on the Route A side and through the bus indicated by the solid line or Route B leading to the memory 2051 via the other interface of the router 2024 on the Route B side and through the bus indicated by the dashed line. Likewise, if the initiator 2001 needs to access the memory 2052, one of two Routes C and D may be selectively taken. In the same way, each of the other two initiators 2002 and 2003 can take one of two routes to access the memory 2051 or 2052.

FIG. 16 shows exemplary route selection rules to be referred to by the NIs 2011, 2012 and 2013. Each of these flows 200101, 200201 and 200301 is a non-rate-ensured flow. The flows 200101 and 200201 have the same degree of priority. The degree of priority of the flow 200301 is lower than that of the flows 200101 and 200201. Information about these degrees of priorities is held, along with the selection rules, in the selection rule storage.

Each of the buses indicated by the solid and dashed lines in FIG. 15 is actually comprised of forward and backward routes, which are not shown in FIG. 15 because those routes are just like their counterparts of the first embodiment. In this embodiment, on both of the forward and backward routes, the bus has a width of 32 bits, operates at 200 MHz and has a connectible bandwidth of 800 MB/s. Hereinafter, it will be described in detail how to allocate routes to a non-rate-ensured initiator using an SoC system with such a configuration. However, the following description of the second embodiment will be focused on only differences from the first embodiment with description of their common features omitted to avoid redundancies.

The initiator 2003 starts to issue a request for allocation of the non-rate-ensured flow 200301 in order to access the memory 2052 earlier than the initiator 2001. At this point in time, none of the other non-rate-ensured flows 200101 and 200201 have been allocated yet. That is why taking the status of allocation of the other rate-ensured flows and the difference in hop count between Routes C and D leading to the memory 2052 into account, Route C is allocated to the initiator 2003. Next, when the initiator 2001 issues a request for allocation of the non-rate-ensured flow 200101 in order to access the memory 2051, the NI 2011 gets the non-rate-ensured flow allocation status from the bandwidth information management circuits on the respective selectable routes and selects Route A, not Route B. In this manner, it is possible to avoid interference with the non-rate-ensured memory access by the initiator 2003 on the dashed line route. As a result, both of the flows 200101 and 200301 can make their memory accesses using the physical bandwidth as their upper limit. Also, when the initiator 2002 issues a request for allocation of the non-rate-ensured flow 200201 in order to access the memory 2052, the NI 2012 gets the non-rate-ensured flow allocation status from the bandwidth information management circuits on the respective selectable routes to find that the non-rate-ensured flow 200101 with a high degree of priority has already been allocated to Route A and that the non-rate-ensured flow 200301 with a low degree of priority has already been allocated to Route B. Since the degree of priority of the flow 200201 is as high as that of the flow 200101, the NI 2012 allocates the flow 200201 to Route c in order to avoid interference between flows with a high degree of priority.

The initiator side network interface (NI) 110 shown in FIG. 8 is an exemplary configuration for the NIs 2011, 2012 and 2013 shown in FIG. 15. The following description of this second embodiment will be focused on only components with different functions from the NI 110 of the first embodiment with description of components having the same function as the NI 110 omitted.

(Selection Rule Storage 111)

Since each of the flows is non-rate-ensured type and the maximum requested bandwidth cannot be defined, the selection rule stored in the selection rule storage 111 includes information indicating that the flow is non-rate-ensured type. Also, if there is an order of priorities between those non-rate-ensured flows, information indicating the respective degrees of priorities is also stored there.

(Route Load Detector 112)

The route load detector 112 gets the current route-by-route allocation status of non-rate-ensured flows from the bandwidth information management circuits 101 on the respective routes as candidate routes to be selected.

FIG. 17 shows exemplary pieces of information gotten from the bandwidth information management circuits on Routes A and C when the initiator 2001 issues a request for allocation of the flow 200101. Since no non-rate-ensured flow has been allocated to Route A, the number of flows is zero on both of the forward and backward routes. On the other hand, since a single non-rate-ensured flow has already been allocated to Route C with respect to the initiator 2003, the number of flows is one on both of the forward and backward routes.

FIG. 18 shows exemplary pieces of information gotten from the bandwidth information management circuits on Routes A and C when the initiator 2002 issues a request for allocation of the flow 200201. Since a single non-rate-ensured flow has already been allocated to Route A with respect to the initiator 2001, the number of flows is one on both of the forward and backward routes. Likewise, since a single non-rate-ensured flow has already been allocated to Route C with respect to the initiator 2003, the number of flows is one on both of the forward and backward routes.

In this embodiment, the value indicating the status of allocation of a route is supposed to be the number of non-rate-ensured flows allocated to that route. However, the value indicating the status of allocation of a route may also be a binary value indicating whether or not any flow has been allocated yet. Still alternatively, if an average requested bandwidth can be defined for a non-rate-ensured flow, the value indicating the status of allocation may also be a value weighted with an average requested bandwidth.

(Candidate Route Extraction Circuit 118)

By operating at least one of the candidate forward route extraction circuit 113 and the candidate backward route extraction circuit 114, the candidate route extraction circuit 118 extracts, candidate routes from groups of routes so that loads on the routes that form a group of routes on at least one of the forward and backward routes become as uniform as possible. Specifically, the candidate route extraction circuit 118 operates the candidate forward and backward route extraction circuits 113 and 114 as will be described below.

(Candidate Forward Route Extraction Circuit 113)

The candidate forward route extraction circuit 113 selects a route to which no non-rate-ensured flow has been allocated yet according to the route-by-route allocation status of non-rate-ensured flows with respect to the forward route that has been gotten by the route load detector 112 from the bandwidth information management circuit 101. If there are no such routes, then the candidate forward route extraction circuit 113 selects a route to which only a flow with a lower degree of priority than the flow to be allocated has been allocated. But if there are no such routes, either, then the candidate forward route extraction circuit 113 selects, as the candidate forward route to be allocated to the flow, a route i, of which the number of allocation of flows with a degree of priority that is equal to or higher than that of the flow to be allocated is the smallest.

(Candidate Backward Route Extraction Circuit 114)

The candidate backward route extraction circuit 114 selects a route to which no non-rate-ensured flow has been allocated yet according to the route-by-route allocation status of non-rate-ensured flows with respect to the backward route that has been gotten by the route load detector 112 from the bandwidth information management circuit 101. If there are no such routes, then the candidate backward route extraction circuit 114 selects a route to which only a flow with a lower degree of priority than the flow to be allocated has been allocated. But if there are no such routes, either, then the candidate backward route extraction circuit 114 selects, as the candidate backward route to be allocated to the flow, a route i, of which the number of allocation of flows with a degree of priority that is equal to or higher than that of the flow to be allocated is the smallest.

(Route Determining Circuit 115)

The route determining circuit 115 detects a non-rate-ensured flow start request from the initiator 2001, and searches the selection rule storage 111 using the flow ID as a search key, thereby extracting a route selection rule about the flow. On the flow with the flow ID "200101", the following processing may be performed. Specifically, the route determining circuit 115 may instruct the route load detector 112 to get the status of allocation of non-rate-ensured flows, thereby obtaining results about the candidate forward route extraction circuit 113 and the candidate backward route extraction circuit 114. As for the forward route selection rule with respect to such a flow, since the flow is the non-rate-ensured type, the output route of the candidate forward route extraction circuit 113, which has resulted in the highest degree of uniformity in the number of flows allocated between the forward routes, is determined to be the forward route to allocate. Likewise, as for the backward route selection rule, since the flow is the non-rate-ensured type, the output route of the candidate backward route extraction circuit 114, which has resulted in the highest degree of uniformity in the number of flows allocated between the backward routes, is determined to be the backward route to allocate. Once the forward and backward routes have been allocated to the non-rate-ensured flow, the route determining circuit 115 notifies the bandwidth information management circuit 101 on the allocated route of flow related information, which is information about the flow to which those routes have been allocated. The flow related information needs to include at least information indicating that this is a non-rate-ensured flow.

FIG. 19 shows an exemplary format for a flow related information notification packet. Since the packet is not a memory access request packet, NULL is stored as memory side NI ID in the field on the first column. The ID of the forward route that has been allocated is stored in the field on the second column. The ID of the initiator side NI that is the origin is stored in the field on the third column. The ID of the backward route that has been allocated is stored in the field on the fourth column. A value "1" indicating that a single non-rate-ensured flow has been newly allocated to the forward route is stored in the field on the fifth column. The degree of priority of the flow that has been allocated to the forward route is stored in the field on the sixth column. A value "1" indicating that a single non-rate-ensured flow has been newly allocated to the backward route is stored in the field on the seventh column. And the degree of priority of the flow that has been allocated to the backward route is stored in the field on the eighth column. By providing these pieces of information as a notification packet for the bandwidth information management circuit 101, the bandwidth information management circuit 101 on each route can manage the flow allocation status of every non-rate-ensured flow on the routes.

(Bandwidth Information Management Circuit 101)

In this embodiment, the bandwidth information management circuits 101 are supposed to be arranged in the interface of the router 2024 on the Route A side and in the interface of the router 2025 on the Route C side. However, the bandwidth information management circuits 101 may also be arranged anywhere else on the routes as long as the bandwidth information on the respective routes can be managed there. The bandwidth information management circuit 101 on the route i manages the allocation status $A_i$ of a non-rate-ensured flow which is currently allocated to the route i on the basis of the degree of priority of each flow, and updates $A_i$ in response to the notification of the allocation result that has been received from the route determining circuit 115. In a state where no flows have been allocated yet when the system is started, for example, $A_i$ indicating the number of non-rate-ensured flows allocated is initialized by following Equations (11) and (12), where "fwd" and "back" are superscripts denoting a forward route and a backward route, respectively.

$$A^{fwd}_i = 0 \tag{11}$$

$$A^{back}_i = 0 \tag{12}$$

FIG. 19 shows an exemplary allocation result notification packet received from the route determining circuit 115 when the allocation processing is done on the flow j. If the forward route ID stored on the second column of the packet is the ID of the route i managed by the bandwidth information management circuit 101, the value $A_i$ indicating the non-rate-ensured flow allocation status is updated by the following Equation (13) using the value $a_j$ indicating the forward route allocation status of the flow j that is stored in the fifth column field of the packet:

$$A^{fwd}_i = A^{fwd}_i + \alpha^{fwd}_j \qquad (13)$$

If the backward route ID stored on the fourth column of the packet is the ID of the route i managed by the bandwidth information management circuit 101, the value $A_i$ indicating the non-rate-ensured flow allocation status is updated by the following Equation (14) using the value $a_j$ indicating the backward route allocation status of the flow j that is stored in the sixth column field of the packet:

$$A^{back}_i = A^{back}_i + \alpha^{back}_j \qquad (14)$$

On the other hand, if the non-rate-ensured flow j that has already been allocated to the route i has disappeared due to a change of the state of the initiator, for example, the allocated bandwidth $A_i$ is updated by following Equations (15) and (16) in response to the non-rate-ensured flow deallocated status notification received from the route determining circuit 115:

$$A^{fwd}_i = A^{fwd}_i - \alpha^{fwd}_j \qquad (15)$$

$$A^{back}_i = A^{back}_i - \alpha^{back}_j \qquad (16)$$

By constantly updating the allocation status Ai on the basis of the degree of priority as the non-rate-ensured flow is allocated to, and deallocated from, the route i, the allocation status of the non-rate-ensured flow that is allocated to the forward and backward routes of the route i can be managed by the bandwidth information management circuit 101. At the request from the route load detector 112, the bandwidth information management circuit 101 provides the value $A_i$ representing the allocation status of the non-rate-ensured flow on the basis of the degree of priority.

According to such a configuration, even in a situation where there are multiple non-rate-ensured initiators which are accessing memories to the upper limit of the bus' physical bandwidth on the system, the bandwidth used by the bus can be controlled in the best way on each of the forward and backward routes. As a result, data can be transferred in a broad band using parallel buses with a low bus operating frequency. Optionally, the flow allocation processing may also be carried out on only one of the forward and forward routes.

Embodiment 3

Generally speaking, as for an access from an initiator to a memory, even if there are multiple flows with similar requested bandwidths, the memory spaces that can be used by the respective flows are usually different from each other. That is why not only uniformity in the bandwidth of the flows allocated to the routes leading to the memories but also the memory area spaces used by those flows need to be taken into account.

Figure 20:
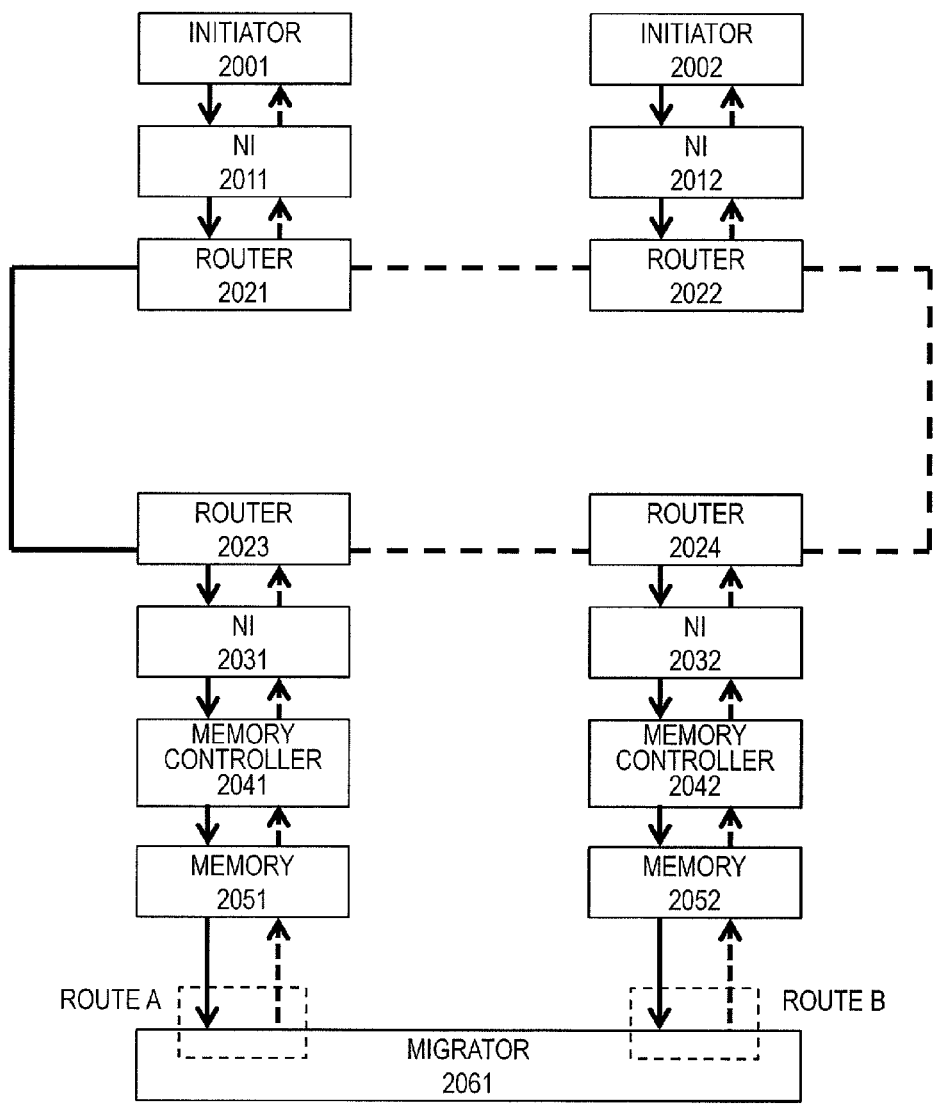
FIG. 20 illustrates an exemplary configuration for an SoC system according to a third embodiment as still another example of the present invention.

FIG. 20 illustrates an exemplary configuration for an SoC system according to this third embodiment. Memories 2051 and 2052 are connected together via a migrator 2061. In the following description, any component having substantially the same function as its counterpart of the SoC system that has already been described for the second embodiment will not be described all over again.

FIG. 21 shows the properties of flows generated by respective initiators. Both of the initiators 2001 and 2002 are real-time initiators, of which the requested bandwidths can be defined.

In this embodiment, the bandwidth information management circuits 101 are arranged on the interfaces of the migrator 2061 to Routes A and B to manage the allocated bandwidth information and allocated spaces of the flows that are allocated to the memories 2051 and 2052, respectively. At the start time shown in FIG. 21, each flow issues a flow allocation request and a memory is allocated to the flow.

As in the first embodiment described above, the processing of allocating memories to the respective flows is carried out time-sequentially.

FIG. 22 shows exemplary flow allocation states. At a point in time tc=4000 cycles when the last flow 200202 finishes being allocated to the memory, a bandwidth of 200 MB/s is allocated to each of the memories 2051 and 2052. That is to say, this is a state in which the bandwidths are allocated uniformly to the respective memories.

On the other hand, comparing the allocated spaces of the respective memories to each other, it can be seen that a space of 200 MB is being used in the memory 2051 and a space of 800 MB is being used in the memory 2052. In such a situation, in a system comprising two memories, each having a physical storage capacity of 800 MB, 600 MB out of the maximum usable storage space of the memory 2051 will be still unused.

By comparing the allocated spaces to each other, the migrator 2061 senses that the usable storage spaces of the memories are imbalanced, and updates the flow allocation state. Specifically, the migrator 2061 selects flows 200101 and 200102 with the same requested bandwidth and transfers the flow 200101 from the memory 2051 to the memory 2052 and also transfers the flow 200102 from the memory 2052 to the memory 2051, thereby setting the spaces used in both of the memories 2051 and 2052 to be 500 MB. In this manner, the allocated bandwidths and the allocated spaces of the memories 2051 and 2052 can be both optimized.

The NIs 2011 and 2012 shown in FIG. 20 have the same configuration as the initiator side network interface (NI) 110 shown in FIG. 8. To determine the flow to be exchanged between the memories, the bandwidth information management circuit 101 manages the requested bandwidth and requested space of each flow on a flow ID basis, and selects a flow to be used in exchange by reference to those pieces of information so as to optimize both of the allocated bandwidth and allocated space between the memories. When the exchange is done, the migrator 2061 sends a notification of change to the associated NI on the initiator side. And on receiving the notification of change, the NI on the initiator side updates the route allocation result.

Embodiment 4

In the second embodiment described above, the selected route leading from an initiator to a memory is illustrated in FIG. 15 as being spatially separated. However, this is just an example of the present invention.

Figure 23:
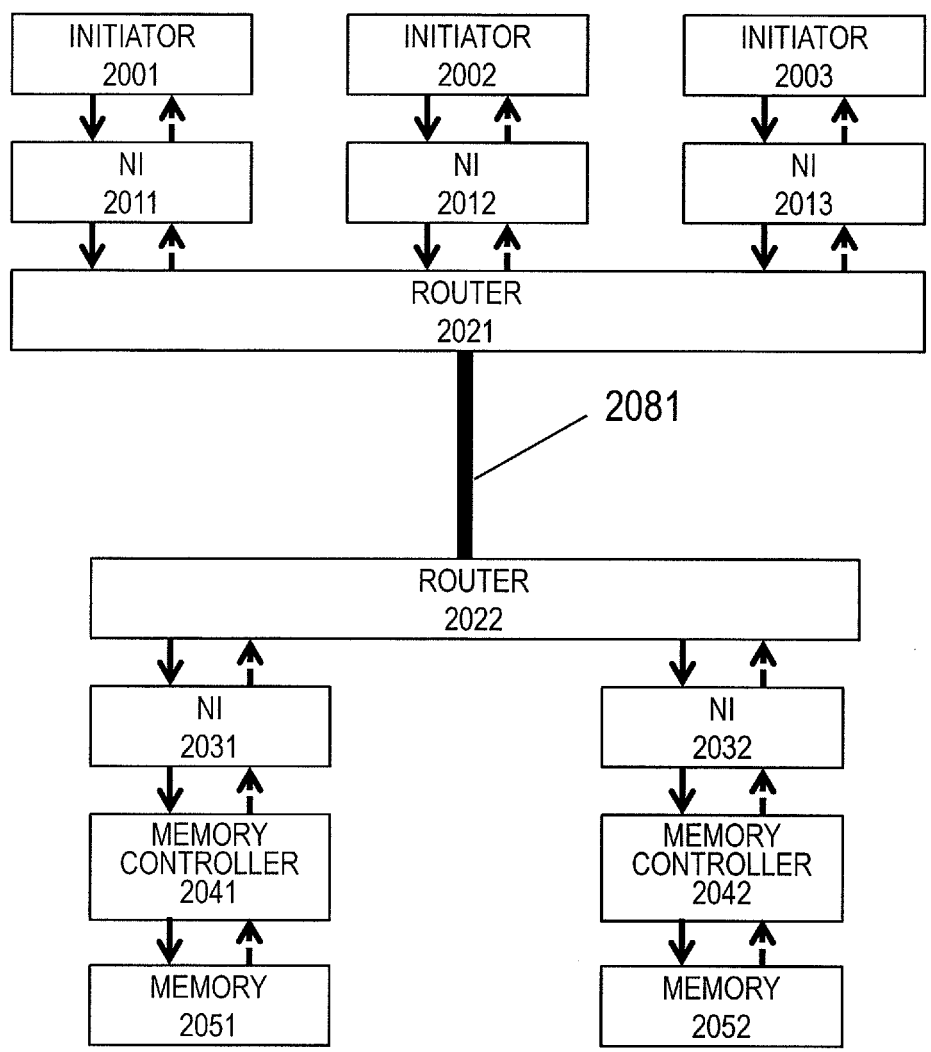
FIG. 23 illustrates an exemplary configuration for a network according to a fourth embodiment as yet another example of the present invention.

FIG. 23 illustrates an exemplary configuration for a network according to this embodiment. Initiators 2001, 2002 and 2003 are connected to a router 2021 via NIs 2011, 2012 and 2013, respectively, and the router 2021 is connected to another router 2022 through a broadband link 2081. The broadband link 2081 may have had its bandwidth broadened either by increasing its bus width or by raising the operating frequency to transfer data. If the bandwidth is broadened by increasing the bus width, the bus width of the link 2081 may be set to be twice as large as that of the links that connect the initiators to the router 2021. A half of the signal lines of the link 2081 are allocated to Route A and the other half of signal lines are allocated to Route B. There are two bandwidth information management circuits 101 to manage the bandwidth information of Routes A and B on the router 2022.

Figure 24:
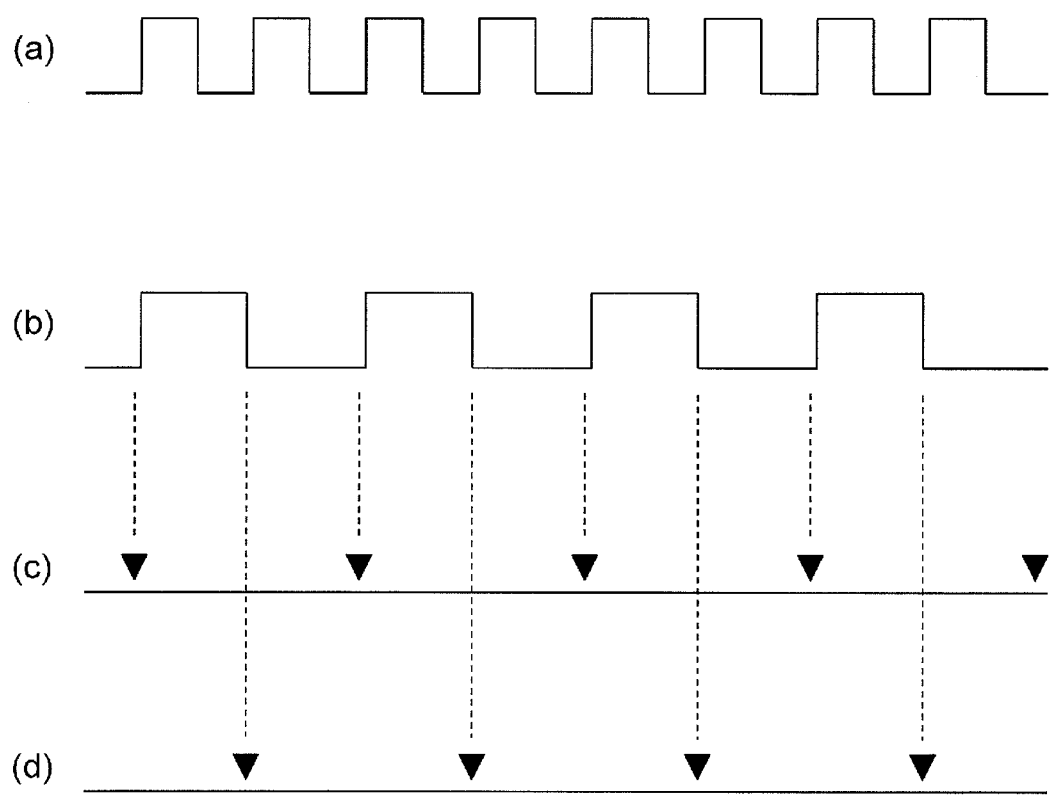
FIG. 24 shows an exemplary method for separating routes.

On the other hand, if the bandwidth of the link 2081 is broadened by raising the operating frequency to transfer data, the routers 2021 and 2022 may use an operating frequency which has been divided by two as the frequency of a bus clock signal and may recognize Route A by the leading edge of the clock signal and Route B by its trailing edge, respectively. Portions (a) through (d) of FIG. 24 show an exemplary method for separating the routes. The link 2081 has data transfer ability which is twice as high as the bandwidth of the output link of each initiator (see portion (a) of FIG. 24). Thus, as shown in portion (b) of FIG. 24, the bus clock signal of the link 2081 may have its frequency divided by two and data may be transferred through Routes A and B at the leading and trailing edges of each clock pulse, of which the frequency has been divided by two. For example, portion (c) of FIG. 24 illustrates an example in which data is transferred through Route A at the timings represented by the leading edges of the clock signal, of which the frequency has been divided by two. On the other hand, portion (d) of FIG. 24 illustrates an example in which data is transferred through Route B at the timings represented by the trailing edges of the clock signal, of which the frequency has been divided by two. By adopting such a configuration, the routes can be distributed as effectively as in the first embodiment described above.

The present invention is applicable to a network bus controller, control method and control program which use a data transfer route control technology on an on-chip bus at an SoC for an integral device, a general-purpose processor, or a local bus on a DSP.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A bus controller for use in a bus control system for a semiconductor circuit in which data is transmitted between first and second nodes over a network of buses, the controller being connected directly to the first node and comprising:
    a route load detector which detects loads on respective routes that form at least one of a forward route group and a backward route group, the forward route group being comprised of two or more routes leading from the first node to the second node, the backward route group being comprised of two or more routes leading from the second node to the first node;
    a candidate route extraction circuit which extracts a candidate route from the at least one group of routes so that loads on the respective routes that form the group become as uniform as possible;
    a selection rule storage which stores a predetermined selection rule, the selection rule comprising at least one of a selection rule that imposes no limitations on routes, a selection rule that designates a particular route to use, and a selection rule indicating that this is a non-rate-ensured flow;
    a route determining circuit which determines the route to transmit the data based on the candidate route that has been extracted by the candidate route extraction circuit and the selection rule stored in the selection rule storage;
    a header building circuit which generates header information that includes route information indicating the route that has been determined; and
    a data communication circuit which transmits the data between the first and second nodes through the route that has been designated by reference to the header information.

2. The bus controller of claim 1, wherein the route load detector detects, as the route load, a bus' operating bandwidth which is allocated to at least one of the forward and backward route groups.

3. The bus controller of claim 1, wherein the at least one route group is the forward route group, and
    the candidate route extraction circuit extracts, as the candidate route, one of the forward routes that has a lighter route load than any other route in the forward route group.

4. The bus controller of claim 1, wherein the at least one route group is the backward route group, and
    the candidate route extraction circuit extracts, as the candidate route, one of the backward routes that has a lighter route load than any other route in the backward route group.

5. The bus controller of claim 1, wherein if the selection rule storage stores a selection rule indicating, when there are multiple flows as data transmission units, in what order those flows are to be used,
    if another flow route which observes a predetermined order with respect to a new flow has already been determined and
    if the selection rule indicating the predetermined order of flows is applied to the new flow,
    the candidate route extraction circuit extracts the same route as that another flow route as the candidate route.

6. The bus controller of claim 1, wherein if the selection rule storage stores a selection rule indicating that this is a non-rate-ensured flow,
    if a non-rate-ensured flow route has already been determined and
    if the selection rule indicating that this is a non-rate-ensured flow is applied to the new flow,
    the candidate route extraction circuit extracts, as the candidate route, a different route from an existent non-rate-ensured flow route.

7. The bus controller of claim 1, wherein if the selection rule storage stores a selection rule that designates a particular route to use, and
    if the selection rule that designates the particular route to use is applied to the new flow,
    the route determining circuit determines the route designated by the selection rule to be the route to transmit the data, no matter what route has been extracted by the route extraction circuit.

8. The bus controller of claim 1, wherein if a non-rate-ensured flow route has already been determined,
    if the selection rule storage stores a selection rule indicating that this is a non-rate-ensured flow, and
    if the selection rule indicating that this is the non-rate-ensured flow is applied to the new flow, the candidate route extraction circuit extracts, as the candidate route, a different route from an existent non-rate-ensured flow route.

9. The bus controller of claim 1, wherein the selection rule storage further stores degree of priority information indicating the degrees of priorities of flows at the first node, and the candidate route extraction circuit extracts, as the candidate route, a route to which a flow with a low degree of priority has been allocated by reference to the degree of priority information.

10. The bus controller of claim 1, wherein the data communication circuit transmits and receives the data on a packet basis, and the header building circuit stores the header information in the header of each packet.

11. The bus controller of claim 1, wherein the selection rule is applied to flows having the same degree of priority.

12. A bus control system comprising:
at least one first node;
at least one second node;
the bus controller of claim 1 which is directly connected to the at least one first node; and
a network of buses which form a plurality of routes between the bus controller and the at least one second node,
wherein the bus control system transmits data between the at least one first node and the at least one second node over the buses.

13. The bus control system of claim 12, further comprising a migrator which exchanges data flows that are allocated to the respective memories,
wherein the memories form the at least one second node,
a plurality of routes are provided between the at least one first node and the memories, and
the migrator exchanges the data flows allocated to the respective memories based on operating bandwidths of the buses that are allocated to the routes and on storage spaces that are used on the respective memories.

14. The bus control system of claim 12, wherein the routes are arranged as a plurality of buses that are spatially separated from each other.

15. The bus control system of claim 12, wherein the routes are arranged to form a single signal line on the buses.

16. The bus control system of claim 15, wherein the routes are formed by subjecting the single signal line on the buses to time division multiplexing.

17. The bus control system of claim 12, wherein the network of buses includes local buses with the multiple routes and a system bus, and
the system further includes a bus bridge which connects the local buses and the system bus together.

18. A network interface for use in the bus control system of claim 12, the interface comprising:
a bandwidth information management circuit which manages bandwidth information that is information about the bandwidth of a flow which is currently allocated as a data transmission unit to an associated route; and
a data communication circuit which transmits and receives data from the first node to the second node and vice versa.

19. The network interface of claim 18, wherein the bandwidth information management circuit outputs the bandwidth information via the data communication circuit in response to a request from the route load detector of the bus controller which is included in the bus control system.

20. The network interface of claim 18, further comprising a backward route header building circuit which generates information designating the backward route by reference to route information that is included in the header information to indicate the backward route and which stores, along with information specifying an address, the backward route designating information in the header of a packet.

* * * * *